United States Patent
Aviv et al.

(10) Patent No.: US 12,030,645 B2
(45) Date of Patent: *Jul. 9, 2024

(54) PROGRAMMABLE AUTOMATED LINEAR SITTING USING AN INTELLIGENT PORTABLE BODY-SEAT CUSHION

(71) Applicant: Prophet Productions, LLC, New York, NY (US)

(72) Inventors: Bobby Elijah Aviv, New York, NY (US); David G. Aviv, Las Vegas, NV (US); Mark Schaffel, Thompsons Station, TN (US); Rena Aviv, Las Vegas, NV (US)

(73) Assignee: Prophet Productions, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,766

(22) Filed: Dec. 14, 2022

(65) Prior Publication Data

US 2023/0174238 A1 Jun. 8, 2023

Related U.S. Application Data

(63) Continuation of application No. 17/403,825, filed on Aug. 16, 2021, now Pat. No. 11,530,045.

(Continued)

(51) Int. Cl.
*B64D 11/06* (2006.01)
*B60N 2/60* (2006.01)

(52) U.S. Cl.
CPC ............ *B64D 11/0647* (2014.12); *B60N 2/60* (2013.01); *B64D 11/064* (2014.12)

(58) Field of Classification Search
CPC ....... B60N 2/914; B60N 2/60; B64D 11/0647
See application file for complete search history.

(56) References Cited

U.S. PATENT DOCUMENTS 6,746,041 B2   6/2004 Chang
7,302,959 B2   12/2007 Gonia
(Continued)

OTHER PUBLICATIONS

Leonardo Martins, "Intelligent Chair Sensor Classification of Sitting Posture," Communications in Computer and Information Science, Sep. 2013.

(Continued)

*Primary Examiner* — Timothy J Brindley
(74) *Attorney, Agent, or Firm* — Amy L. Pearson

(57) ABSTRACT

The present invention is a portable, intelligent, ergonomically adjustable body-seat cushion controlled wirelessly via a smartphone or tablet app. Multiple air bladders embedded in the body-seat cushion inflate/deflate at the direction of the app to manipulate the physical position of the user's neck, back, posterior, legs, and feet in order to: (1) alleviate pressure on the back and sit-bones; (2) lengthen the user from a normal sitting position to a lengthened sitting position; and (3) increase blood flow to the user's extremities. Positioning algorithms in the app use the user's anthropometric data (body measurements) and seat measurements (including available space above and in front of the seat) to generate one or more air bladder fill instructions to lengthen the user. The app then wirelessly transmits the positioning instructions as well as optional motion, temperature, and vibration instructions to one or more wireless receivers in the seat cushion.

22 Claims, 20 Drawing Sheets

Related U.S. Application Data

(60) Provisional application No. 63/066,339, filed on Aug. 17, 2020.

(56) References Cited

U.S. PATENT DOCUMENTS

| | | | |
|---|---|---|---|
| 9,359,079 | B2 | 6/2016 | Scott |
| 9,661,928 | B2 | 5/2017 | Patrick |
| 2015/0351692 | A1 | 12/2015 | Pereny |
| 2018/0305026 | A1 | 10/2018 | Yao |

OTHER PUBLICATIONS

Ashwin Sachdeva, "Graduated compression stockings for prevention of deep vein thrombosis," Cochrane Database of Systematic Reviews, Nov. 3, 2018.

MJ Clarke, "Compression stockings for preventing deep vein thrombosis in airline passengers," Cochrane Database of Systematic Reviews, 2016.

Ian Harbison, "Southern comfort: Developing Latam Airlines' cabin reconfiguration," Aviation Business News, Dec. 2, 2019.

Vijah Verghese, "Economy class seat survey," SmartTravel Asia, 2021. http://www.smarttravelasia.com/economy.htm.

"DEA 3250/6510 Class Notes—Sitting and Chair Design," Cornell University Ergonomics Web http://ergo.human.cornell.edu/DEA3250Flipbook/DEA3250notes/sitting.html.

Martina Tierney, "Seating Matters Online Academy" Seating Matters, 2021. https://www.youtube.com/channel/UCZSKYnMhKM92R2FE4qfbIOA.

Martina Tierney, "The Clinician's Seating Handbook," Seating Matters, 2021.

Darcie Jaremey, "Why Reclined Sitting Is Better for Your Health," @darcie_ergo Blog, Dec. 13, 2016 https://medium.com/@darcie_ergo/why-reclined-sitting-is-better-for-your-health-96f6263d58cc.

"Aircraft Cabins Explained," fareboom, 2021. https://www.fareboom.com/FAQ#!/faq_air-faq_airlines-faq_aircraft_cabins_explained.

David Lazarus, "Airlines eye crueler ways of making passengers miserable," Anchorage Daily News, Apr. 27, 2019.

Louise Knapp, "A Nano Fan for Nano Gadgets," Wired, Dec. 27, 2001.

Marisa Garcia, "The Future of the Aircraft Cabin," SKIFT Report #23, 2014.

Jason Pesengco, "Creating the Perfect Seat: Chair Design and Engineering," 2017.

"Correct Sitting Posture: Office," Physio Med Limited, Leeds, UK, https://www.physiomed.co.uk/uploads/guide/file/20/Physiomed_Sitting_Guide_-_Correct_Sitting_Posture_Digital.pdf.

Official Action for U.S. Appl. No. 17/403,825, dated Jul. 27, 2022.

1. Neck air-bladders

1A. 

2. Back air-bladders

2A. Inflates outward.
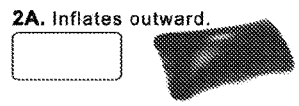

2B. Inflates pushes mid-back slightly forward.

2C. Pushes lumber (L1-L5) forward

3. Seat air-bladders

3A. Inflates vertically.
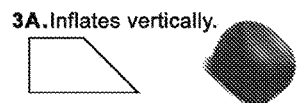

3B. Inflates vertically.
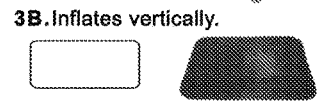

3C. "Pregnant AB (Air bag)"
*AB housed within another AB.*
An "outer" AB inflates vertically while "inner" AB's inflate horizontally.
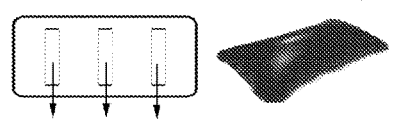

4. Calve air-bladders

4A. Calve cusion (bottom)

5. Footrest air-bladders/Elevators

5A.  5B.
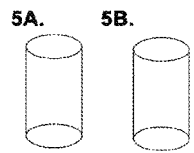

6. Elbow AB extenders

6A.  6B.

Calve cusion alternative AB's

4. Alt 1. 

An air-bladder "sleeve" where one's calves can go inside of to provide compression during long sitting periods to help prevent DVT.

4. Alt 2. 

Footrest alternative AB's

5. Alt 1.
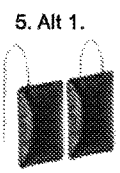

Air-bag Alternatives

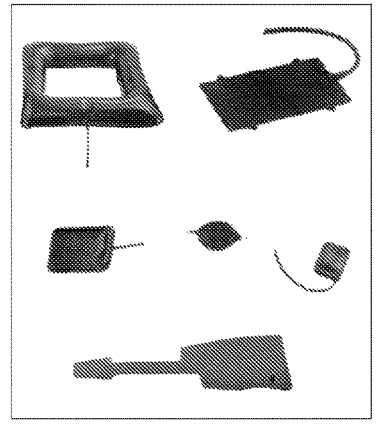

Fig. 10

PROGRAMMABLE AUTOMATED LINEAR SITTING USING AN INTELLIGENT PORTABLE BODY-SEAT CUSHION

BACKGROUND OF THE INVENTION

Sitting for a prolonged amount of time, especially in uncomfortable seats typically found in economy class airlines seats, creates back discomfort and often overall body discomfort. In certain cases, because of the lack of proper blood circulation, one can become susceptible to Deep Vein Thrombosis (DVT). DVT is a potentially life-threatening condition in which a blood clot forms in one of your body's deep veins, typically in one of your legs. These clots are extremely dangerous. They can break off and travel to your lungs, leading to a condition known as pulmonary embolism (PE). Symptoms may include: foot, leg, or ankle swelling—usually on one side; cramping pain—usually beginning in the calf; severe, unexplained pain in the foot or ankle; a patch of skin that feels warmer to the touch than skin surrounding it; and a patch of skin that turns pale or turns a reddish or bluish color. Signs of a PE may include: dizziness; sweating, chest pain that worsens after coughing or deep inhales; rapid breathing; coughing up blood; and rapid heart rate. Symptoms of DVT and PE may not occur for several weeks after a flight.

Sitting for extended periods of time in cramped airplane seats may slow blood circulation and increase the risk of DVT as well as creating excessive pressure on the spine. Prolonged inactivity such as sitting in an airplane seat or lying in a hospital bed pose the most risk.

Seated exercises are suggested for long flights such as ankle circles, foot pumps, knee lifts, shoulder rolls, arm curls, lifting your knee to your chest, bending down to touch your feet/ankles, overhead stretches, shoulder stretching, and neck rolls. When walking around the airplane or seated exercises are not feasible, there exists a need to better position the body to minimize the possibility for DVT or PE.

Leg rests, seat cushions, memory foam lumbar support, and neck pillows can provide minimal comfort but are not customized to the user. Most of these products only address one problem at a time (e.g., neck position/comfort or back position/comfort) and many are of a "one-size-fits-all" design—not customized to the user's unique body physiology.

There are also many simple air bladders that can be used to manually change the user's sitting position by inflating or deflating one or more air bladders.

Many people also try to minimize the discomfort of a long airline flight by: stretching in their seats (where available space is constantly decreasing to pack more people into an airplane), getting up from their seat and walking around the airplane (not practical for many people to do and not possible if on a turbulent flight); or stretching at the back of the airplane (again, not practical for many people to do).

In a 2013 article by L. Martins out of the University of Lisbon in Caparica, Portugal, an intelligent chair sensor was disclosed and developed. Pressure distribution sensors in a chair's seat pad and backrest were used to classify the user's posture. Posture correction algorithms were then used to change the pressure in eight pneumatic bladders thus dynamically adjusting the user's position.

U.S. Pat. No. 9,661,928 issued to Lear Corporation discloses a seat cushion with a plurality of sensors to detect the user's seating position to detect if the occupant is seated evenly. Seating position data is sent to a handheld device to inform the user of an uneven position. The user is able to manually adjust air bladders via a graphical user interface on the handheld device.

Another problem with vehicles, especially airplanes, is the available legroom and space to find a comfortable seating position. Seat pitch, the space between a point on one seat and the same point on the seat in front of it, increases with the class of travel. In economy class, seat pitch averages between 29 and 32 inches (74 to 81 cm), but could be as low as 28 inches (71 cm). American Airlines' business class seat pitches in their former Boeing 767-200s were 62 inches (160 cm), the largest in any short-haul business class. American Airlines' first-class flatbed seats in their Airbus A330-300s have a seat pitch of 94 inches (240 cm).

Since the beginning of the $21^{st}$ century until 2018, average economy class seat width decreased from 18.5 to 17 inches, and sometimes as low as 16.1 inches.

Legroom depends upon seat pitch and the thickness of the seat back. Airlines have claimed that a reduction of seat pitch can be compensated for by a thinner seat-back design.

U.S. Patent Publication 2018/0305026 and U.S. Pat. No. 9,359,079 disclose seats that are staggered vertically and/or forward/backward to provide the users with additional space that they would not have had otherwise. Both of these inventions involve a completely new seat. Airplane seats are very costly to replace because they must be certified by the Federal Aviation Administration (FAA) and manufactured according to very strict specifications. Economy seats cost between $3,000 and $5,000 per seat, depending on comfort and complexity. Domestic US first-class seats cost between $10,000 and $15,000 per seat. Standard international business-class and first-class seats cost between $60,000 and $300,000 per seat.

US Patent Publication 2015/0351692 filed by Lear Corporation discloses a seat cushion that uses anthropometric and sensor data to determine if the user is seated unevenly and uses that data to correct the seating position.

There exists a need for an intelligent portable body-seat cushion that automatically adjusts a user's position based on the measurements of the seat, measurements of available space, and the anthropometric measurements of the user. The seat cushion lengthens and supports the user's body by utilizing the empty space above the user (below any compartments above the user) and below the seat in front of the passenger ("vertical space"). Such a body-seat cushion will help to alleviate pressure on the spine, displace weight from the sit-bones, provide better circulation to prevent health issues such as DVT and PE, and provide maximum available comfort without the need for replacing costly airline seats. In maximizing available space using an adjustable body-seat cushion, it is likely that extra head and leg support is needed.

BRIEF SUMMARY OF THE INVENTION

The present invention is a portable, intelligent, ergonomically adjustable body-seat cushion controlled wirelessly via an application (app) on a phone or tablet. As shown in FIG. 1, multiple air bladders embedded in the body-seat cushion inflate/deflate at the direction of the app to manipulate the physical position of the user's neck, back, posterior, legs, and feet in order to: (1) alleviate pressure on the back and sit-bones; (2) lengthen the user from a normal sitting position as shown in FIG. 2A to a lengthened sitting position as shown in FIG. 2B; and (3) increase blood flow to the user's extremities. Positioning algorithms in the app use the user's anthropometric data (body measurements) and seat measurements (including available space above and in front of the seat) to generate one or more air bladder fill instructions to lengthen the user. The app then wirelessly transmits the positioning instructions as well as optional motion, temperature, and vibration instructions to one or more wireless receivers in the seat cushion which activate: (1) the inflation or deflation of selected air bladders; and (2) motion and vibration mechanisms. The body-seat cushion rolls up similar to a yoga mat for ease of portability.

FIG. 3 shows the process for utilizing the body-seat cushion. First, the user downloads the body-seat cushion app to a smartphone, tablet, smartwatch, or other Bluetooth-enabled smart device. The app allows the user to wirelessly control the inflation, movement, temperature, vibration, and other mechanics of the body-seat cushion. Next, the user manually inputs and/or uses the app to take (via a 3D measurement app or other measuring device) to input various anthropometric measurements of the user. Next, in order to acquire seat measurements (including available space measurements), the user: (1) downloads seat measurements to the app; (2) manually inputs the required measurements; or (3) takes seat measurements (via a 3D measurement app). After the user's anthropometric measurements and the seat-specific measurements are stored, the positioning algorithms in the app wirelessly inflate the air bladders (and adjust other body-seat cushion mechanics) to a predicted ideal comfortable position. The user then has the option to further manually adjust the air bladders (and other body-seat cushion mechanics) using the app. When the user is satisfied with the comfort/positioning of the body-seat cushion, the inflation, vibration, and motion settings can be stored for future use. When the user is finished with use of the body-seat cushion, the app instructs the body-seat cushion to deflate all air bladders and return are body-seat cushion mechanics back to their original/stowing position. The stored inflation settings (and other mechanical measurements) can be used to re-position the user in the same seat at a later time or to be used as a starting point for a similar seat in the future.

The seat cushion may also dynamically manipulate the body so as to increase blood flow by, for example, moving the legs slightly up and down via the foot or leg rests, according to a pre-programmed sequence. The seat cushion may also include vibrating sections to improve circulation and to relax the user, which prevents formation of muscle cramps when sitting for a long period of time.

The seat cushion accomplishes the following:
Eases pain and discomfort often associated with sitting for extended periods of time whether or not the user is in an uncomfortable seat, such as those often found in economy seats on an airplane, train, automobile, or in other situations where sitting is required in a professional or non-professional setting;
Helps to prevent DVT and PE;
Better utilizes available passenger seating space on commercial transportation by using the vertical space above the passenger and under the seat in front of the passenger;
Distributes the user's weight more evenly along the length of the body;
Assists airlines in allowing the pitch between seats to decrease further (as a cost-cutting measure) while providing additional comfort to the passenger using a very light-weight easy to use and transport solution; and
Assists in properly positioning a user's body during physical therapy often necessary due to either a congenital abnormality, an injury, or, during post-operation recovery.

BRIEF DESCRIPTION OF THE DRAWINGS

Illustrated in the accompanying drawing(s) are embodiments of the present invention In such drawings:
FIG. 10 shows various potential sizes and shapes of air bladders that can be used for the invention.

The above described drawing Figures illustrate the described apparatus and its method of use in several preferred embodiments, which are further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

DETAILED DESCRIPTION OF THE INVENTION

Figure 1:
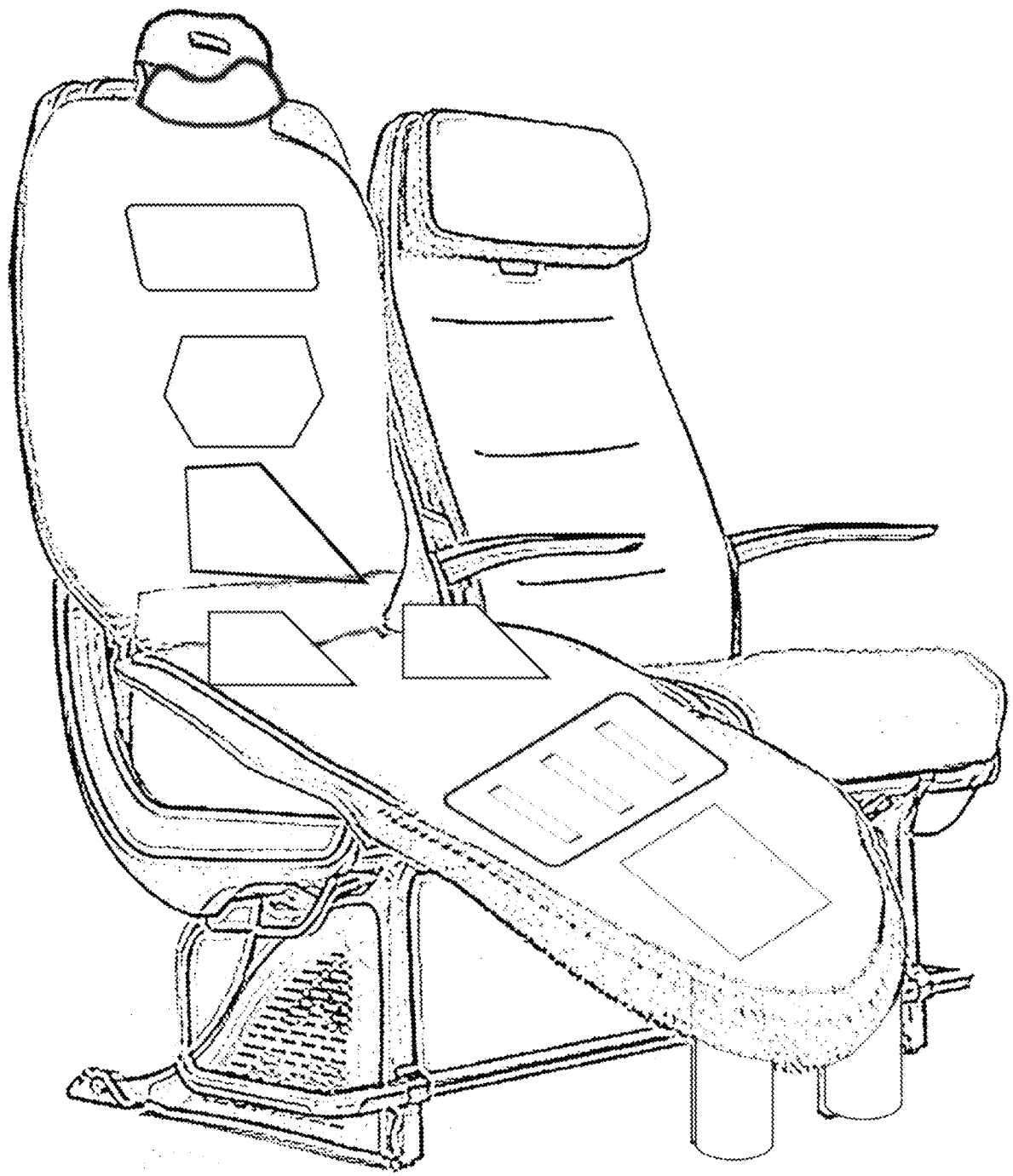
FIG. 1 is an isometric view of one embodiment of the invention showing various air bladder shapes.
Figure 2B:
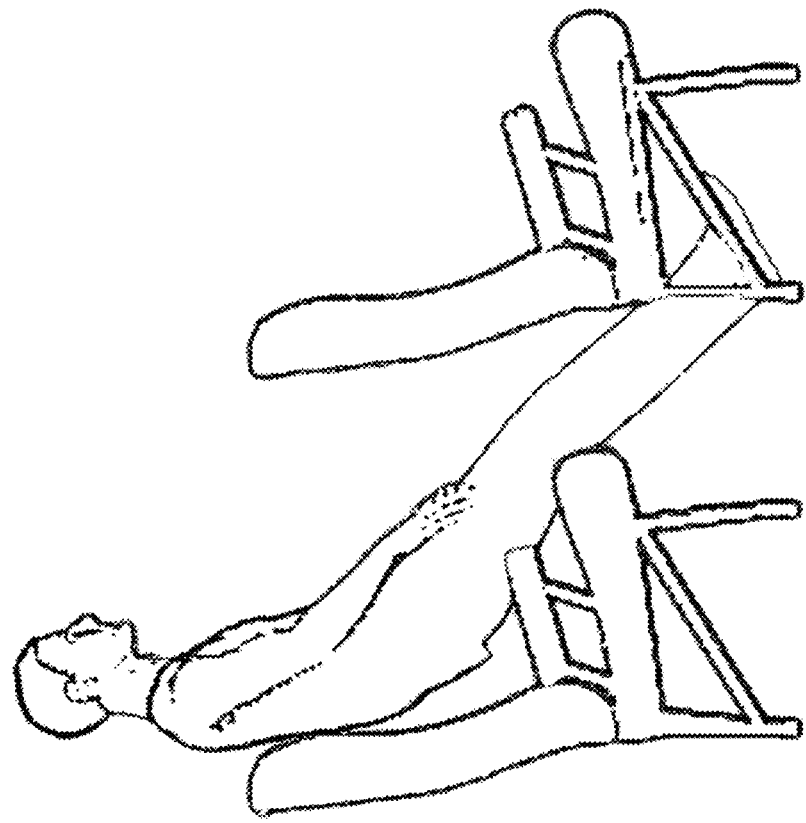
FIG. 2b shows the user's sitting position with the invention (intelligent portable body-seat cushion not shown)
Figure 2A:
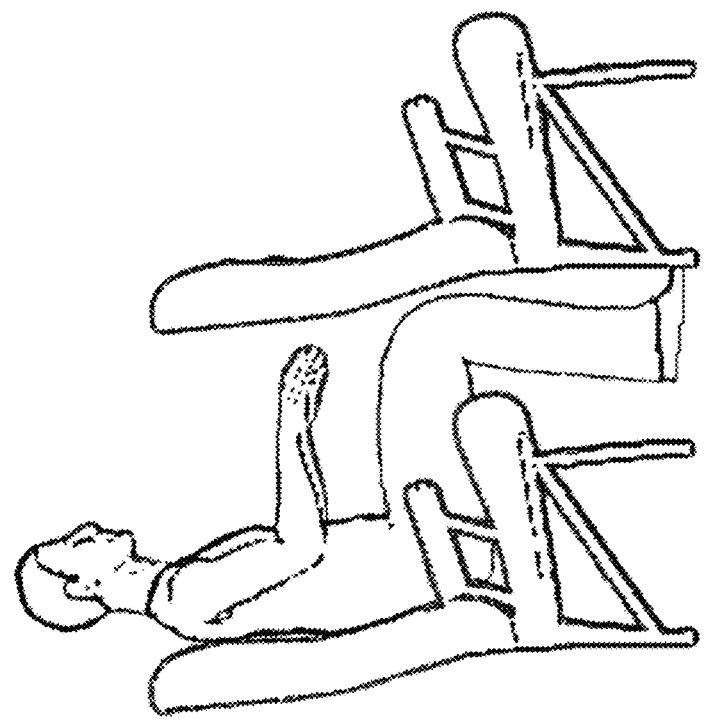
FIG. 2a shows the user's sitting position without the invention.

The present invention is a portable, intelligent, ergonomically adjustable body-seat cushion controlled wirelessly via an application (app) on a phone or tablet. As shown in FIG. 1, multiple air bladders embedded in the body-seat cushion inflate/deflate at the direction of the app to manipulate the physical position of the user's neck, back, posterior, legs, and feet in order to: (1) alleviate pressure on the back and sit-bones; (2) lengthen the user from a normal sitting position as shown in FIG. 2A to a lengthened sitting position as shown in FIG. 2B; and (3) increase blood flow to the user's extremities. Positioning algorithms in the app use the user's anthropometric data (body measurements) and seat measurements (including available space above and in front of the seat) to generate one or more air bladder fill instructions to lift, lengthen and/or otherwise adjust the user. The app then wirelessly transmits the positioning instructions as well as optional motion and vibration instructions to one or more wireless receivers in the seat cushion which activate: (1) the inflation or deflation of selected air bladders; and (2) motion and vibration mechanisms. The body-seat cushion rolls up similar to a yoga mat for ease of portability.

What is it/how it is Made

As mentioned above and as shown in FIG. 1, multiple air bladders (such as those made by Perma-Type Rubber or Aero Tec Laboratories) are embedded in the body-seat cushion.

Figure 4:
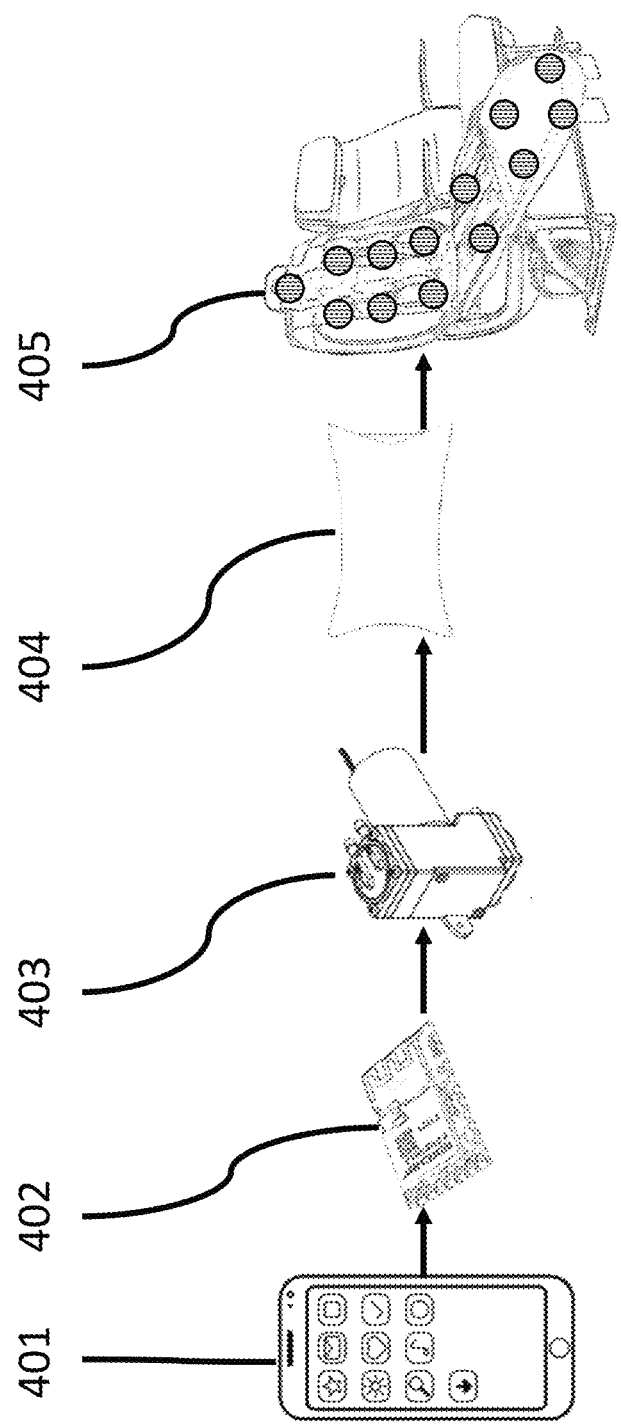
FIG. 4 shows the main components of the invention.

As shown in FIG. 4, an air compressor 403 such as the Boxer 19K diaphragm pump provides a source of air to the air bladders 404 in the body-seat cushion 405. In one embodiment, the diaphragm pump connects to a gang valve (not shown) such as the Pawfly 8-Way Air Flow Control Splitter to split the airflow into multiple branches—one for each air bladder. An electronically controlled stop valve (not shown) such as the HFS 110v AC Electric Solenoid Valve is placed at each outlet to control the airflow to each air bladder. In another embodiment, each air bladder will have its own diaphragm pump and stop valve. Flexible air tubes such as CNZ Flexible Airline Tubing connect the diaphragm pump to the gang valve and the stop valves to the air bladders.

The stop valves are controlled by a controller (such as ST Microelectronics STM32F4) for regulating compressed air into and out of the air bladders. Additional memory for the controller (such as the Digi-Key 557-1904-1-ND) may be necessary to store and process pressure measurement data.

The controller wirelessly receives the adjustment settings from the app using the app interface on a smartphone/tablet 401. Wireless control of the device by the app is achieved with Bluetooth Low Energy (using a WiFi chip 402 such as a Murata Type 1PJ), an ad-hoc wireless network, or similar technology.

The body-seat cushion has a rechargeable lithium-ion battery that can be charged via USB. The USB jack (such as the Amphenol USB Type C 3.1 Connector) located on the body-seat cushion, charges a lithium-ion battery (such as the RS Pro 18650 26H Li-ion Battery Pack) using a lithium-ion battery charger (such as the Analog Devices LTC 4053-4.2). Alternatively, one can simply plug-in the USB cable to a USB adapter plugged into an electronic source, or directly into a USB enabled electronic source often found in most commercial airline seats. A miniature on/off switch (such as the Hongkong Rtl Industrial Limited Miniature Horizontal Slide Switch) for the body-seat cushion allows battery conservation while not in use. A status LED (such as the Kingbright Right Angle SMD Chip LED Lamp) allows the user to see when the body-seat cushion is on, off, or pairing via Bluetooth.

The body-seat cushion outer shell can be made of a material such as Ottertex Marine Vinyl or Sensation Upholstery Hide.

Figure 5:
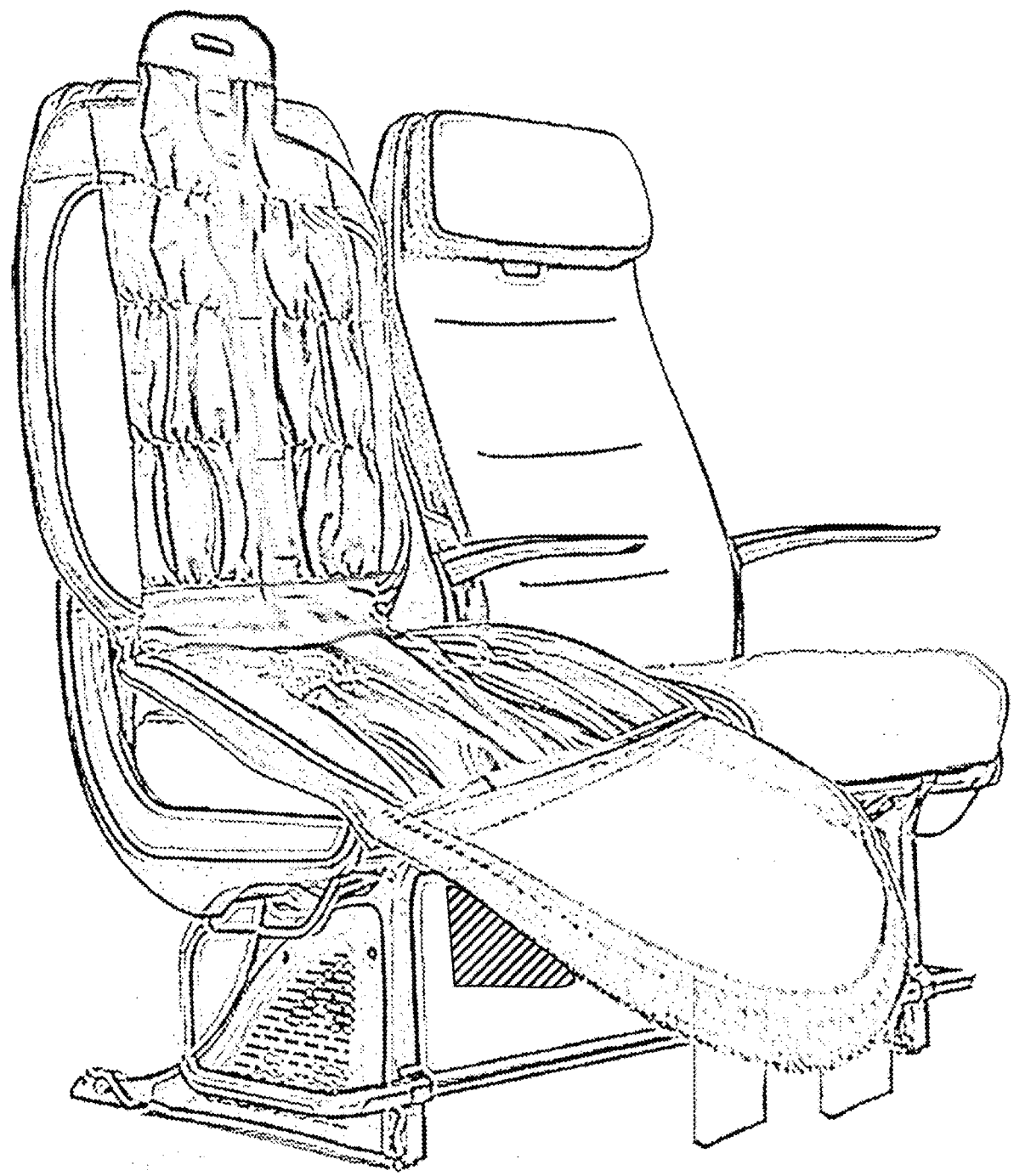
FIG. 5 is an isometric view of the invention showing the location of electrical and mechanical components.

As shown in FIG. 5, all hardware and electronics may be housed under the body-seat cushion behind the leg rest area.

Process

Figure 3:
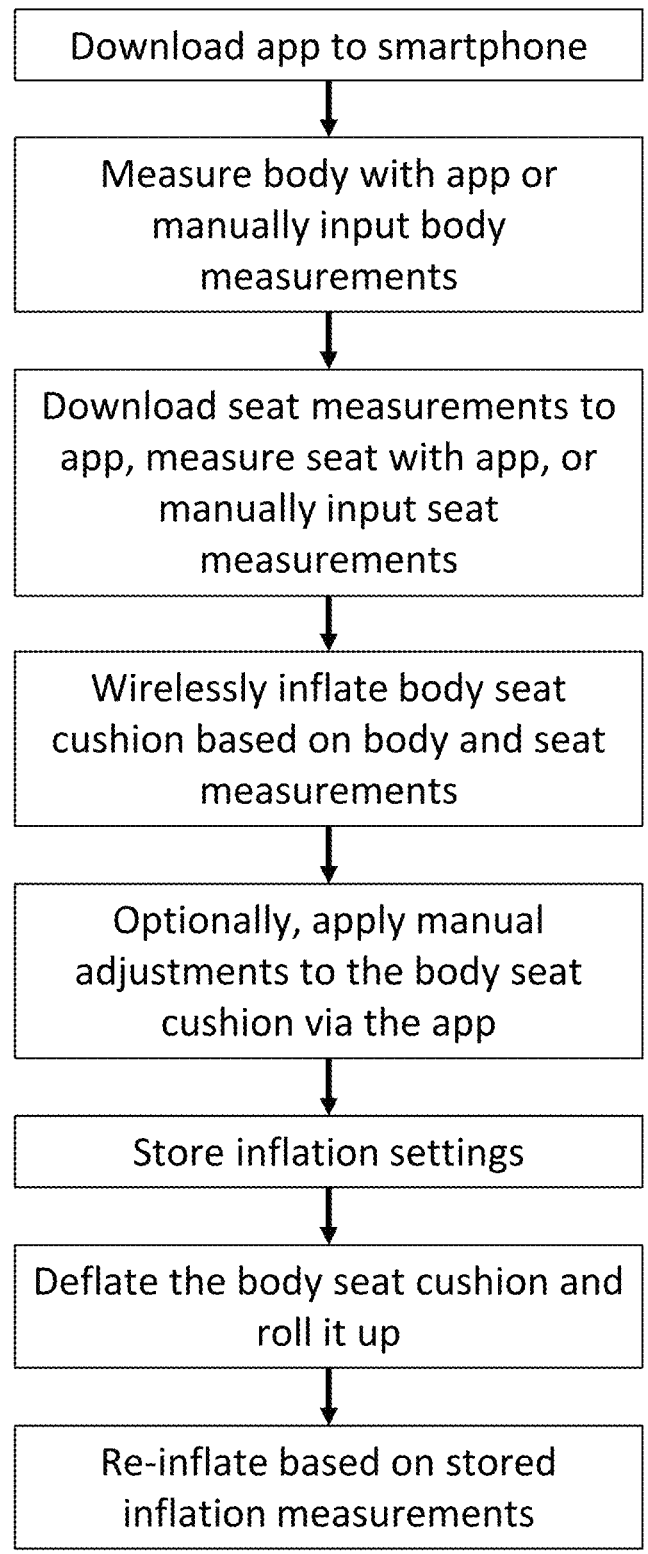
FIG. 3 shows the process for utilizing the invention.

FIG. 3 shows the process for utilizing the body-seat cushion. First, the user downloads the body-seat cushion app to a smartphone, tablet, smartwatch, or other Bluetooth-enabled smart device. The app allows the user to wirelessly control the inflation, movement, vibration, and other mechanics of the body-seat cushion.

Figure 6:
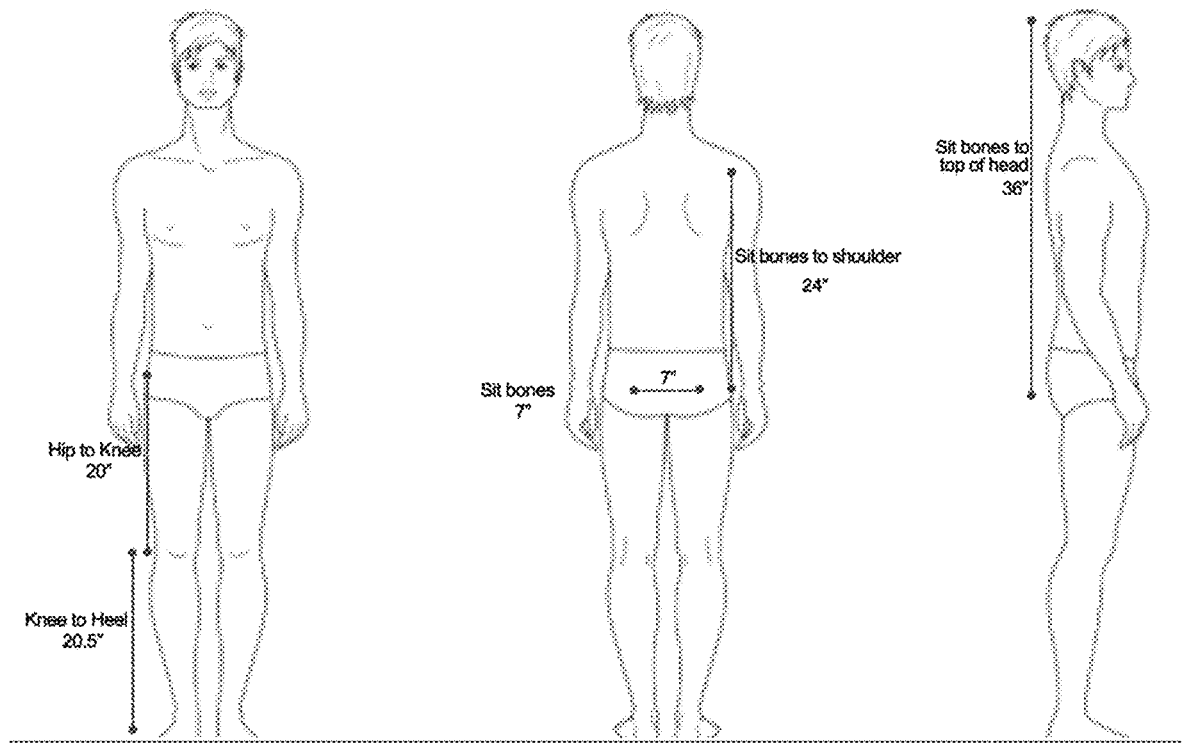
FIG. 6 shows a few anthropometric measurements.

Next, the user uses the app to take (via a 3D measurement app) or manually input various anthropometric measurements of the user. The user's anthropometric measurements include, but are not limited to: height; weight; length of hip to knee; length of knee to foot; shoe size; length of shoulder to elbow; length of elbow to hand; length of neck to waist; width of user from shoulder to shoulder (or bicep to bicep, whatever is greater); when sitting up-right, horizontal distance from the user's back to the most furthest point of the user's knee; when sitting up-right, distance from the bottom of the thigh to the top of the shoulders and top of the head; calf thickness. Some of these measurements are shown in FIG. 6.

Many anthropomorphic measurements may be required to achieve a comfortable seating position. Smartphones have just recently become able to take 3D body measurements with apps such as Nettelo, 3DSizeMe, and itSeez3D. These apps could be integrated into body-seat cushion app or used externally with the body measurements being able to be exported or downloaded from the 3D measurement app and uploaded into the body-seat cushion app.

Next, in order to acquire seat measurements (including available space measurements), the user: (1) downloads seat measurements to the app; (2) manually inputs the required measurements; or (3) takes seat measurements (via a measurement app).

Seat measurements include seat length/height/width, headrest position/size, the available vertical space between the top of the seat cushions/headrest and the ceiling or the bottom of the overhead bin, in the case of an airplane, and other measurements such as those found on Cornell University's Ergonomic Website on Sitting and Chair Design.

If using an airplane seat database, the user needs to input the airline, airplane model, class, and seat number. Alternatively, the airlines may provide a link to your pre-assigned seat's data. If using a car seat database, the user needs to input the make, model, year, and starting seat position. If using a train seat database, the user needs to input train station, train line, and seating class, seating location, or type of seat. To date, the applicant is not aware of any commercially available database including seat measurements or available space measurements of seats found on commercial transportation such as trains, subways, buses or airplanes.

In one embodiment, seat measurements can be made through a 3D measurement app such as such as Measurement 3D-Plumb-bob, Measure 3D Pro AR Ruler, Nettelo, and itSeez3D. These apps could be integrated into the body-seat cushion app or used externally with the seat measurements to be exported or downloaded from the 3D measurement app and subsequently integrated into the body-seat cushion app.

Seat measurements can be acquired from a seat measurement database (storing seat measurements, for example, for a seat in Rows 50-88 in the Economy section of a United Airlines Boeing 777-200) accessed within the seat cushion app itself. Alternatively, seat measurements can also be acquired via a measuring app similar to Google AR Measure. Alternatively, seat measurements can be simply inputted manually into the seat cushion app.

After the user's anthropometric measurements and the seat-specific measurements are stored, positioning algorithms in the app wirelessly inflate the air bladders (and adjust other body-seat cushion mechanics) to a predicted comfortable position.

Highly correlated trendlines (trendlines with high R-squared values) in the experimental data (discussed later) are used to create body positioning algorithms in the app. The positioning algorithms use the user's anthropometric data and seat data (including available space) to automatically adjust the seat bladders so that the user is positioned into a comfortable, lengthened position as shown in FIG. 2B.

The user wirelessly transmits the calculated ideal linear seating position from the app to the body-seat cushion controller.

Figure 7:
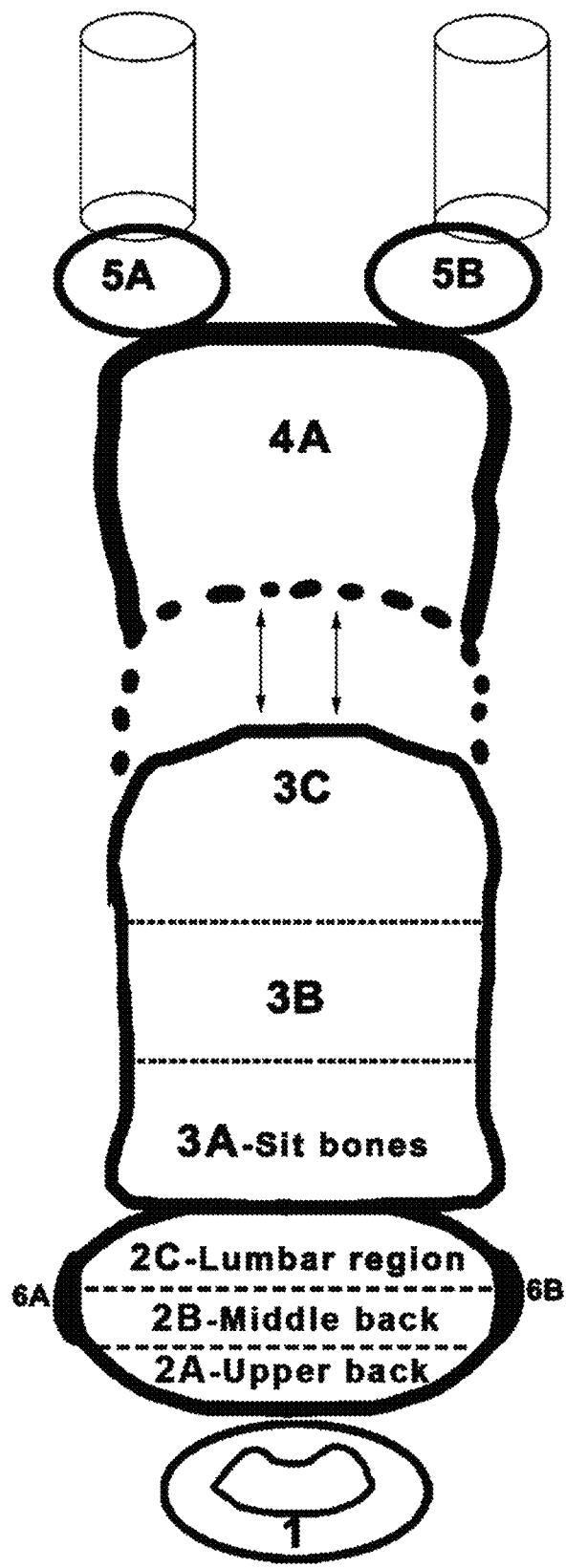
FIG. 7 is a top down view of the air bladder layout for a one embodiment of the invention.

FIG. 7 is an air bladder layout diagram for one embodiment of the invention. First, seat pan air bladder FIG. 7, 3A lifts the user up within the available vertical space. Then, to compensate for lifting the user at an angle and to stabilize the user, at the same time (or near the same time), footrest and leg rest air bladders 5A, 5B, and 4B inflate. Next, the user is pushed forward by air bladder 2C to get the user into a lengthened position. Neck rest air bladder 1 is then inflated to stabilize the user's head. The remaining seat cushion air bladders 3B, 3C and back air bladders 2B, 2A are inflated to level out and stabilize the user. Finally, armrest air bladder 6A, 6B are inflated.

In one embodiment, after the instructions are received by the wireless receiver, a microprocessor/controller can be used to incorporate seat sensor or other local data for real-time seat adjustments. An example of a real-time seat adjustment is auto-inflation under the user's right posterior when the user leans to the left. Piezoresistive pressure sensors (such as the Fujikura AG203-001MG) or pneumatic pressure sensors can be used to measure the pressure in each air bladder.

Then the user has the option to manually adjust the air bladders (and other body-seat cushion mechanics) using the app.

The user always has the option to manually control or adjust the air bladders and other seat cushion mechanics. Adjustments (discussed in detail below) made by the app/bladder system include, but are not limited to, lumbar support, leg compression, leg motion, neck support, foot support, foot/ankle motion, arm support, vibration, as well as other ergonomically enhancing inflatable adjustments to be used on seats such as airline seats to alleviate pressure on the spine and sit bones as well as improve circulation In one embodiment, the body-seat cushion dynamically manipulates the body so as to keep the user's blood flowing to extremities in order to improve circulation and prevent DVT and PE. Footrest air bladders FIG. 7, 5A, 5B and FIG. 8, 5A, 5B can repeatedly move the user's legs up and down according to a pre-programmed sequence applied in the app.

In one embodiment, the seat cushion may also include vibrating sections to relax the user and improve circulation, thus preventing muscle cramps when stationary for a long period of time. Vibration can be produced with a DMiotech DC 3V 6800RPM 2 Pin Magnetic Vibrating Motor for Car Seat Massagers and controlled via the app.

In one embodiment, calf compression can be performed by sandwiching each of the user's calves (and optionally, ankles) between the leg rest air bladder FIG. 1, 4A and an upper leg rest air bladder 4B that inflate and deflate towards each other in a pulsing motion. Compression is controlled via the app.

Figure 8:
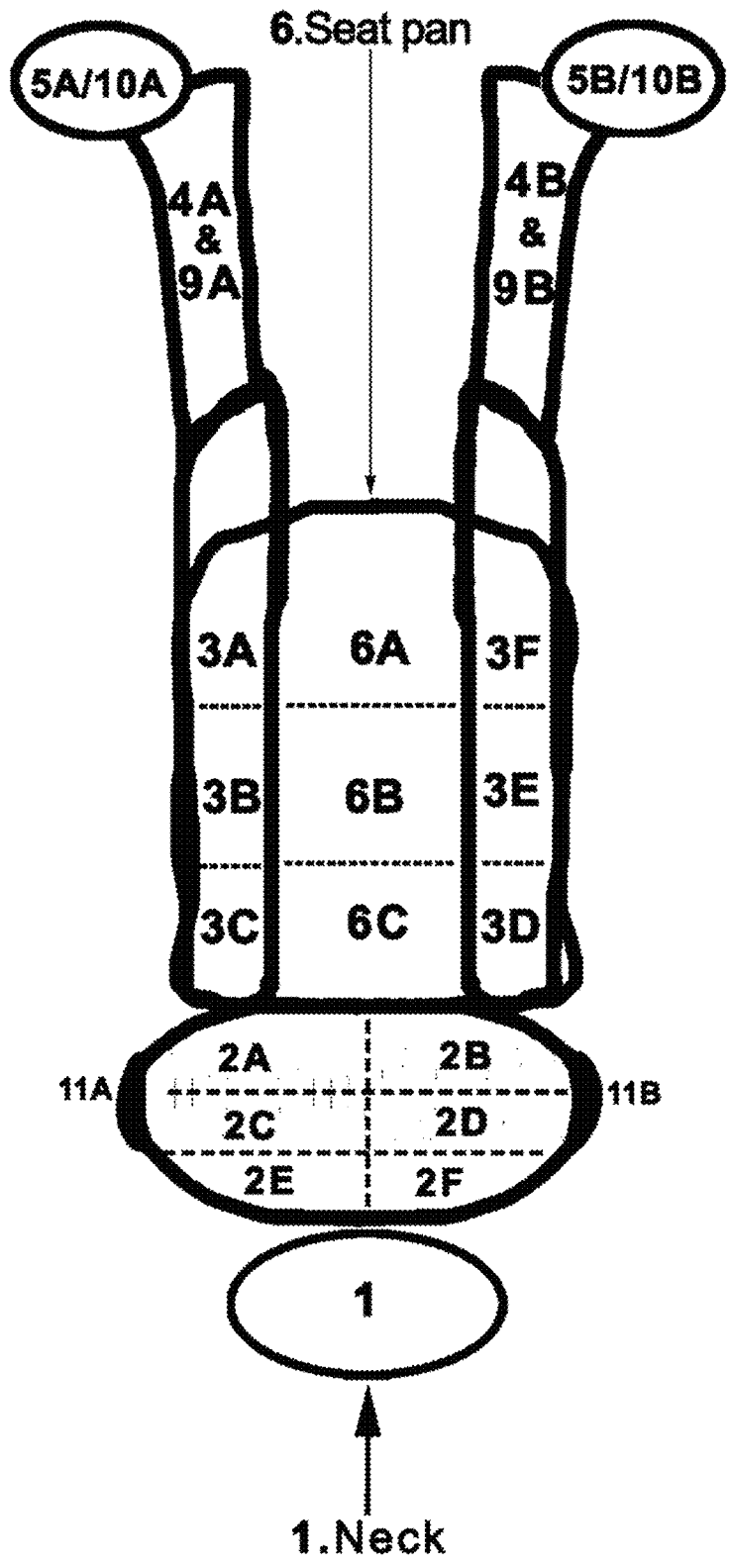
FIG. 8 is a top down view of the air bladder layout for one embodiment of the invention.

In another embodiment, calf compression is accomplished using detachable or interchangeable leg air bladder sleeves (one for each leg) FIG. 8, 9A, 9B that attach to the air supply of the body seat cushion using an external air port (not shown).

Compression provides substantial protection against DVT, PE and/or reducing swelling in those in danger of getting blood clots. Even gentle compression can aid in moving blood up the leg allowing the blood to flow more freely from the legs up to the heart, improving overall blood flow and circulation. According to a 2008 study by A. Sachdeva entitled "Graduated compression stockings for prevention of deep vein thrombosis," compiling data from 20 trials and 1,681 patients who had prolonged immobilization in the hospital after an operation, compression was proven to have aided in the prevention of developing DVT. In another study from 2016 by M J. Clarke, entitled, "Compression stockings for preventing deep vein thrombosis in airline passengers," specifically examining the use of compression socks on airline flights longer than four hours in length, it was found that the use of compression significantly reduced the risk of developing symptomless DVT.

When the user is satisfied with the comfort/positioning of the body-seat cushion, the inflation, vibration, and motion settings can be stored for future re-use. The stored inflation settings (and other mechanical measurements) can be used to re-position the user in the same seat at a later time.

For example, air volume used for each air bladder and app settings (vibration/motion instructions) can be stored. Alternatively, position changes such as a vertical seat height change of 2 inches or a lumbar horizontal change of 6 inches can be stored.

In one embodiment, pressure sensor data is used to re-inflate the air bladders.

The body-seat cushion app is able to recognize like seats to give like seat positioning predictions. For example, an economy class airplane seat on an international American Airlines flight will likely have very similar seats to an economy class airplane seat on an Air Italia international flight. The seats will likely have the same or very similar seat pan height and seat pitch. The app can apply stored American Airlines international flight economy class seat settings to an economy class seat on an Air Italia flight.

The body-seat cushion is designed to be portable/collapsible (easy to roll-up, similar to a yoga mat) so that it can easily be transported and used on various seats in various locations. When the user is finished with use of the body-seat cushion, the app instructs the body-seat cushion to deflate all air bladders and return the body-seat cushion mechanics back to their original/stowing position.

Figure 9:
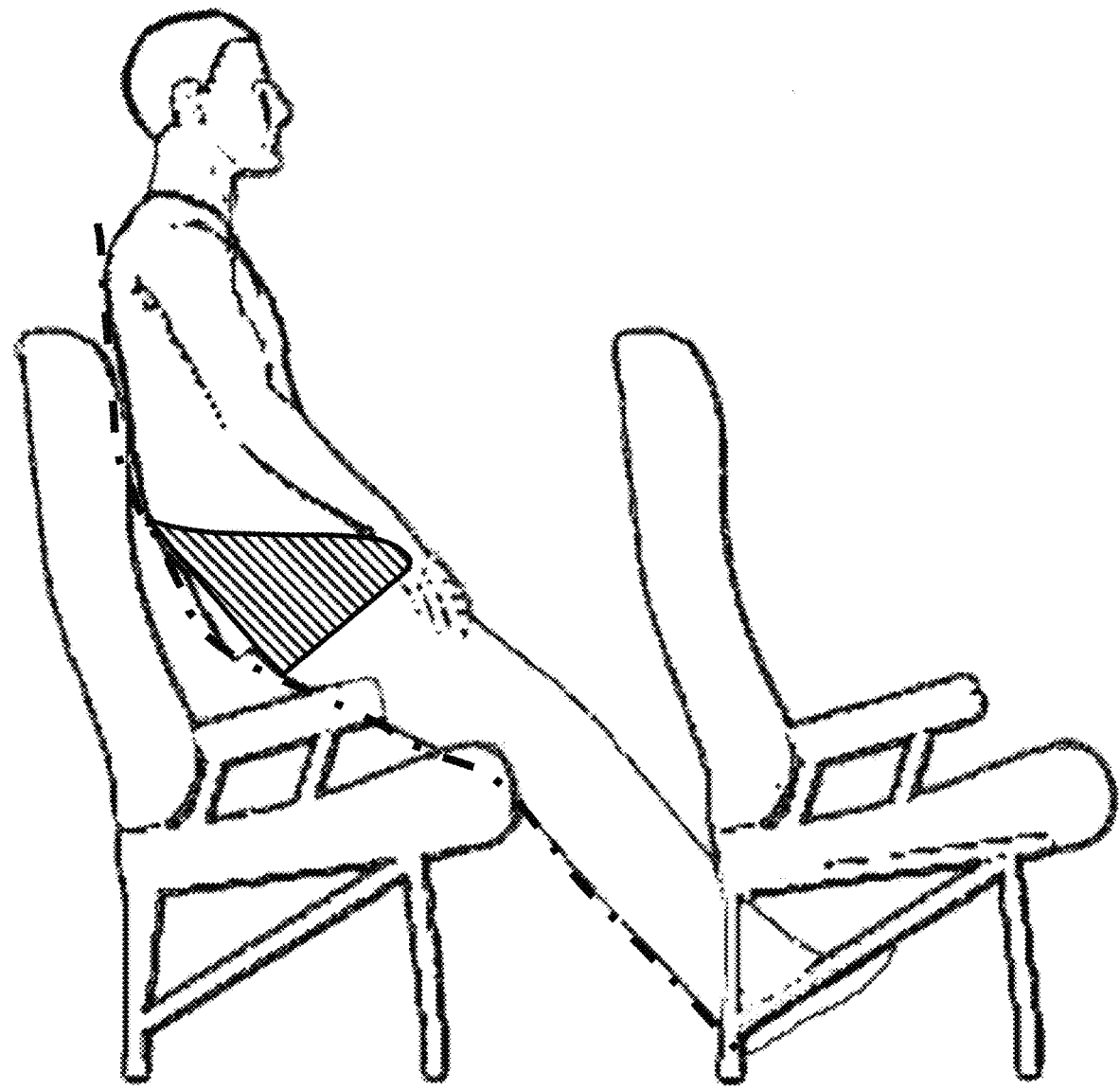
FIG. 9 shows a side view outline of the invention and the arm rest shape for one embodiment of the invention.

Elbows naturally lay slightly away from the body when standing or sitting. Because the body-seat cushion puts the user into a slightly more vertical position, body-seat cushion armrests as shown in FIG. 7, 6A/6B and FIG. 8, 11A/B extend slightly horizontal. As shown in FIG. 9, armrests may be necessary on the body-seat cushion because the user will probably be raised up to the point that the underlying chair's armrests will be useless as armrests.

In one embodiment the body-seat cushion has inflatable armrests that can expand upwards from the seat pan area or outwards from the seat back (FIG. 9), Varying arm rest height levels would provide additional comfort for the user and allow the neighboring person greater access to the shared armrest.

Options

The bladders may be filled with air, gel, or other liquid or a combination thereof.

As shown in FIG. 10, differently shaped and sized air bladders can be used in the body-seat cushion to maximize comfort of and/or efficiently move the user into the desired lengthened position.

Changes in temperature, barometric pressure and altitude will cause slight pressure changes to occur in the inflated bladder. A safety cut-off feature such as a pressure release valve prevents over-inflation of the air-bladders within the body-seat cushion. Alternatively, the controller can detect and prevent over-inflation of the air bladders utilizing the pressure sensors located at the outlet valve of each air bladder.

Figure 11B:
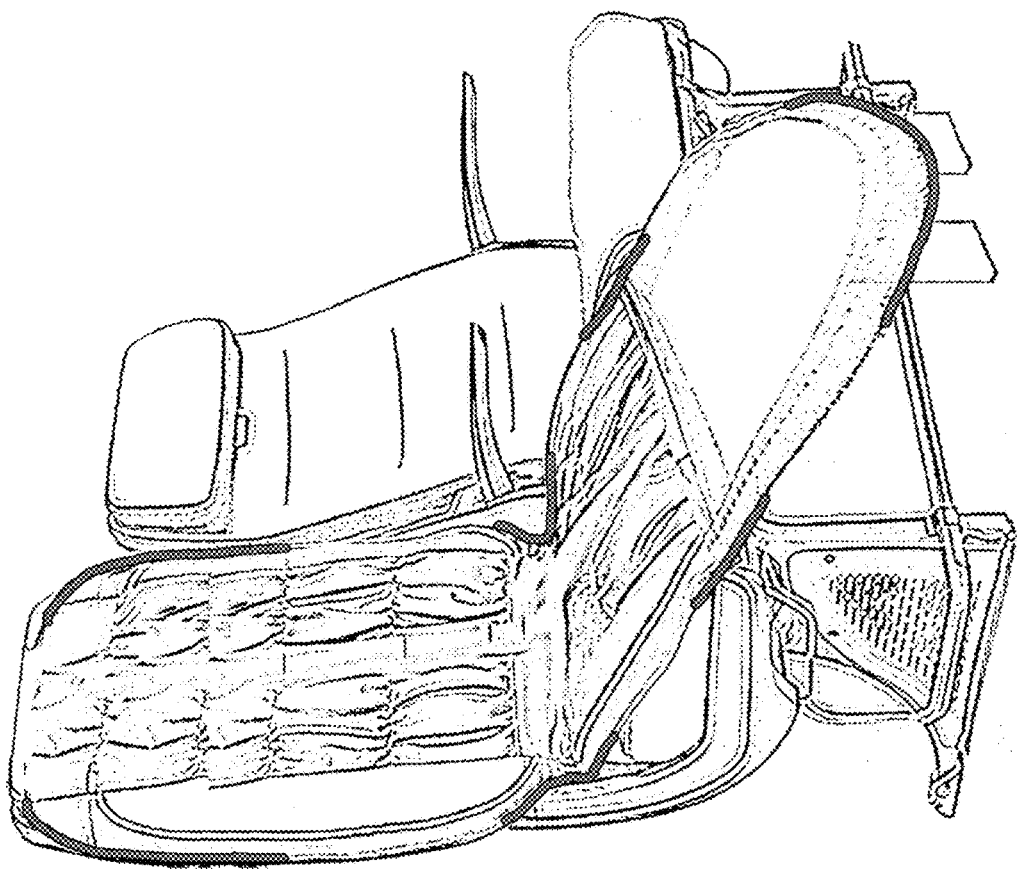
FIG. 11b shows an isometric view of the invention with the back of the body-seat cushion raised.
Figure 11A:
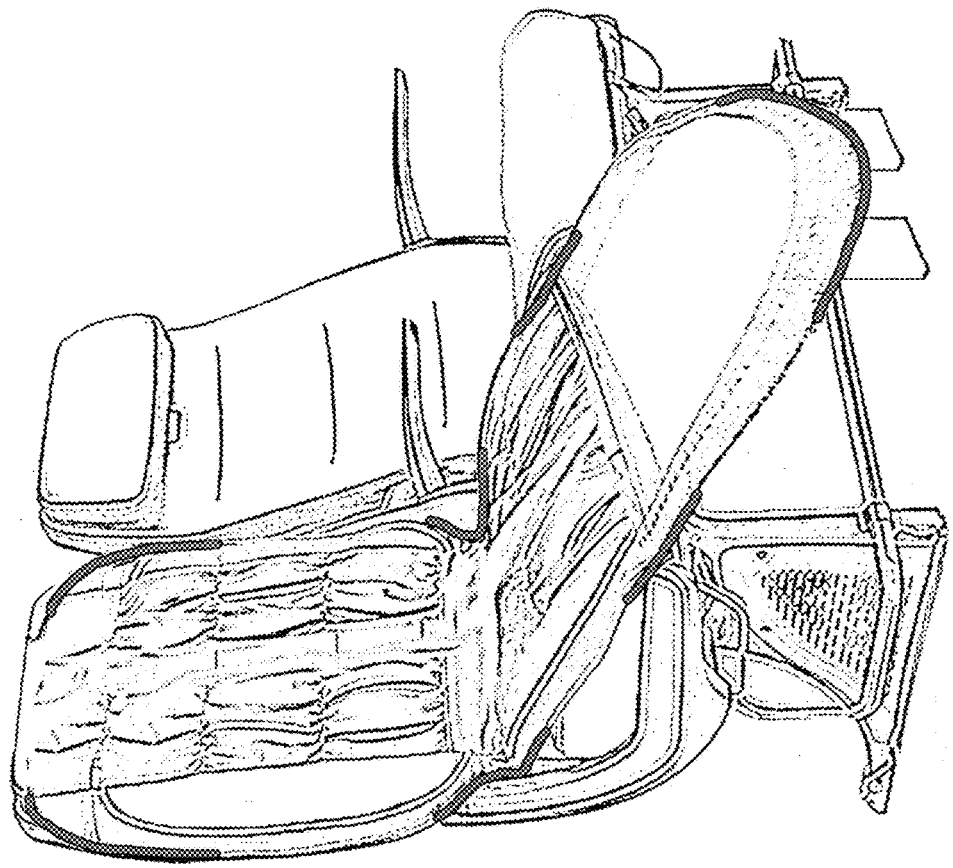
FIG. 11a shows an isometric view of the invention.

In another embodiment, extending or telescoping rods (like an extending rod found in a presentation pointer) on each side of the body-seat cushion can be used to extend the length of the back cushion, neck cushion, or the leg cushion to provide additional structural support. Extending/telescoping rods along the length of the body-seat cushion can also help to support the user's leg weight. The extending/telescoping rods can be wirelessly controlled by the app. FIGS. 11A and 11B show the back cushion not extended and extended.

Boston Valves can be used for quick deflation.

Figure 12:
FIG. 12 shows a thin flexible support wireframe around areas of the body-seat cushion.

In one embodiment, a wireframe support system is used in certain parts of the body-seat cushion to enhance stability of the body-seat cushion on the underlying seat. The wireframe is made from a lightweight, flexible material such as vinyl, silicon or PVC tubing that allows repeated rolling and unrolling of the body-seat cushion for transportation and storage. Example of this type of tubing would be Dernord PVC Tubing ¼"ID×⅜"OD Flexible Clear Vinyl Hose or PharmaFluor® T1500 Tubing. The wireframe can also be split into multiple sections to further allow ease in rolling and unrolling of the body-seat cushion. As shown in FIG. 12, a wireframe section may be placed around the upper back portion of the body-seat cushion, at the sides of the body-seat cushion, at the intersection of the back and seat pan sections, and in the foot cushion region.

In one embodiment, piezoelectric fans are used to inflate the air bladders. The app sends on/off instructions to wireless receivers in the body-seat cushion.

Figure 13:
FIG. 13 shows one embodiment of the invention with an extended neck support.

The added height of the adjusted seat pan air bladders may necessitate additional neck support than that already provided by a seat, especially for taller users. Neck support can be provided as part of the seat-back cushion (FIG. 7, 2A) or as an extension from the seat-back cushion as shown in FIG. 13. Neck positioned air bladders can hug the neck on either side of the spine (cervical vertebrae C1-C7). The neck air bladders can extend vertically, slightly lengthening/straightening the spine. Various air bladder shapes and sizes can be used as shown in FIG. 10 to better accommodate the neck.

In another embodiment footrest air bladder pillars shown in FIG. 1, 5A/5B or a footrest air bladder block will extrude from the bottom of the body-seat cushion and drop to the floor and fill with air. The height of the footrest(s) will depend on the user's height, shoe size and available space. If the footrest air bladders are not being used, Velcro can be used to secure the loose uninflated air bladders to the body-seat cushion outer shell. Various air bladder shapes and sizes can be used as shown in FIG. 10.

The body-seat cushion also can be used as a full body massager by laying the body-seat cushion flat on the ground. Small air bladders along the spine can then pulse on/off to a rhythm delivered by the app.

In another embodiment, the air bladders can be interchangeable so that the body-seat cushion can serve different purposes such as massaging for relaxation, comforting for long term work or gaming, or therapeutic or medical purposes. Interchangeable bladders could be swapped by unzipping the outer shell of the body-seat cushion and detaching and reattaching the air bladders.

Figure 14:
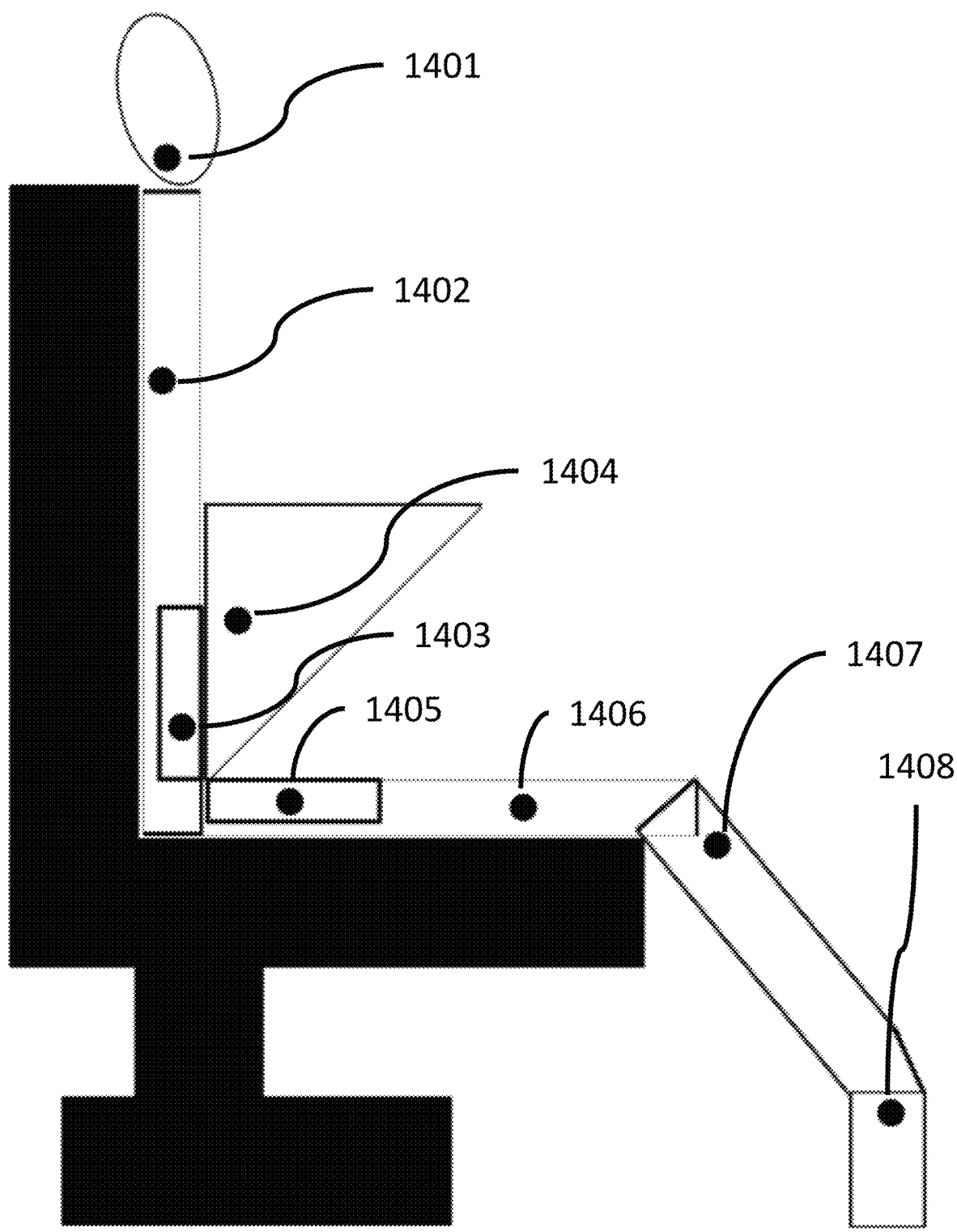
FIG. 14 shows one embodiment of the invention with manually inflatable air bladders.

In one embodiment, the air bladders can all be or selectively be manually inflated by a pinch valve which allows air into the cushion without leaking back out when the user pauses to take another inhalation of breath. Each AB should not require more than 4 exhalations of air to fill up. To deflate the manual air bladders, the user pinches the pinch valve at the blow hole to allow air to escape. In an alternate embodiment, a foot pump such as the Texsport Deluxe High Volume Bellows Foot Air Pump or a hand pump such as the ICOCOPRO Mini Bike Pump can also be used. In either case, the app can be used to instruct the user to fill each air bladder with a certain number of breaths or for a certain amount of time. This is highly variable as different people have different lung capacities, blow strengths, etc. FIG. 14 shows the air bladder layout for the manual inflation embodiment. The black dots represent the air-intake pinch valves located at the neck air bladder 1401, the upper seatback air bladders 1402, lower seatback airbladders 1403 (right-angled trapezoid that lays in front of upper seat bladder 1402), left and right arm rest air bladders 1404), sit-bones air bladders 1405 (right-angled trapezoid that lays on top of rectangular air bladder 1406, calves air bladders 1407, and foot rest air bladders 1408.

In an alternate embodiment, a small external air compressor such as the YTA Portable Air Compressor can also be used. Because this type of air compressor also comprises a pressure sensor, the user can pre-set a certain desired pressure as suggested by the app.

Heating and cooling elements can optionally be added to the seat cushion. Heat therapy has long been used to ease a wide variety of aches, pains, and maladies. Applying heat to the affected area encourages better blood flow and alleviates the symptoms associated with poor circulation. Ice or heat packs may be inserted into the body-seat cushion sleeves. Alternatively, each air bladder can be filled with hot or cold air.

The body-seat cushion can also adjust the user's position based on the positions of neighboring broadcasting body-seat cushions. The app can be used to get the body-seat cushion data (position, user size) from seat neighbors. This data can be broadcast wirelessly over Bluetooth or RFID. This data can be used to horizontally and vertically stagger seat neighbors so that one user can fill voids made by another user's body-seat cushion adjustments. Armrests can also be staggered. Alternatively, armrests can have a lounge chair mechanism so that when the front part of the arm rest is lifted, the back part (attached to the body-seat cushion back) is able to be placed in different locking positions to allow comfort for neighboring passengers.

Experimental Data

Preliminary experimental data to test the invention was collected using 3 human subjects and 2 different chairs. FIG.

Figure 15A:
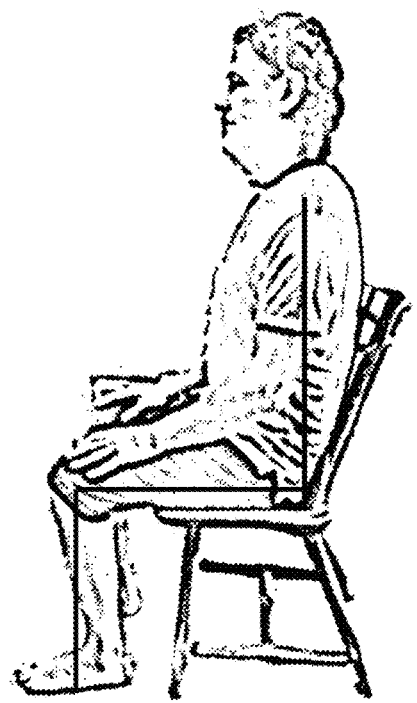
FIG. 15a shows a subject in an regular sitting position.
Figure 15B:
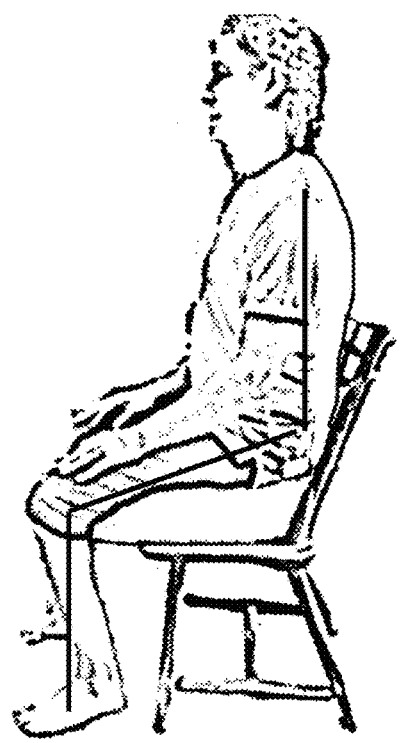
FIG. 15b shows a subject raised by simulated seat pan air bladders (pillows)
Figure 15C:
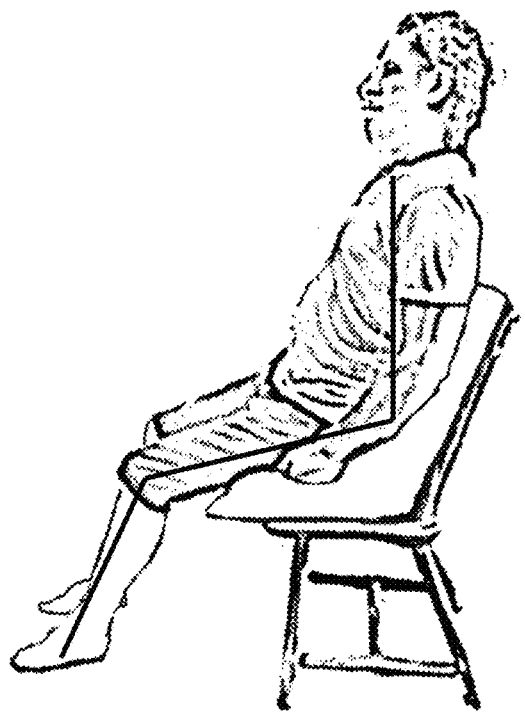
FIG. 15c shows a subject pushed forward tangential to the lumbar region by simulated lumbar region air bladders (pillows)
Figure 15D:
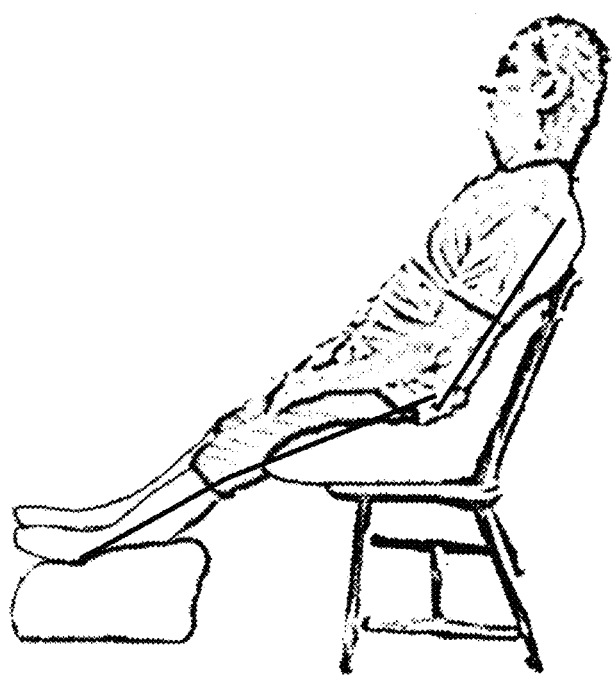
FIG. 15d shows a subject's feet raised by simulated foot/calf rest air bladders (pillows)

15A shows a subject in a regular sitting position. FIG. 15B shows simulated seat pan air bladders (pillows) to raise the subject. FIG. 15C shows simulated lumbar region air bladders (pillows) pushing tangential to the lumbar region, moving the pelvic floor forward. FIG. 15D shows simulated foot/calf rest air bladders (pillows) to support the feet/legs and lengthen the subject.

The subject's measurements are shown in Table 1.

TABLE 1

|  | Subject 1 | Subject 2 | Subject 3 |
| --- | --- | --- | --- |
| Hip to knee length | 20 in | 19 in | 19 in |
| Knee to heal | 20.5 in | 17 in | 19 in |
| Sit bone to Sit bone | 7 in | 7.5 in | 8 in |
| Sit bone to top of head | 36 in | 25 in | 26 in |
| Sit bone to shoulder | 24 in | 17.5 in | 17 in |
| Height | 71 in | 62 in | 65 in |
| Weight | 168 lbs | 185 lbs | 128 lbs |

Chair measurements are shown in Table 2.

TABLE 2

|  | Chair 1 | Chair 2 |
| --- | --- | --- |
| Seat Pan Width | 14 in | 15 in |
| Seat Pan Depth | 16 in | 13 in |
| Seat Height off Ground | 16 in | 17.5 in |

Table 3 shows adjustments made to make the subject comfortable while utilizing vertical space and the space under the seat in front.

TABLE 3

| Chair 1 Air Bladder Comfort Adjustment | Subject 1 | Subject 2 |  |
| --- | --- | --- | --- |
| 6B & 6C | 3.5 in | 4 in | to lift up |
| 2A & 2B | 2.5 in | 8 in | to slide forward |
| 2C-2F | 1.5 in | 1.5 in | to straighten back |
| 5A & 5B | 3.5 in | 3.5 in | to stabilize feet |
| 4A & 4B | 0.75 in | 9 in | to support leg |

TABLE 4

| Chair 2 Air Bladder Comfort Adjustment | Subject 1 | Subject 2 |  |
| --- | --- | --- | --- |
| 6B & 6C | 3.5 in | 5 in | to lift up |
| 2A & 2B | 4 in | 3.5 in | to slide forward |
| 2C-2F | 2.5 in | 1.5 in | to straighten back |
| 5A & 5B | 3.5 in | 4.5 in | to stabilize feet |
| 4A & 4B | 0.75 in |  | to support leg |

In order to put the subject in a comfortable position, the subject was first lifted up on cushions (to simulate using vertical space—the empty space between the subject's head and the overhead compartment on an airplane) so that the subject could lean back, straighten out (lengthen), and slide forward. In the preliminary data shown in Table 3 and Table 4, measurements 6B and 6C (referring to air bladders 6B and 6C as shown in FIG. 8) show that the subject was lifted up by 3 to 5 inches. After lifting up, the subject was able to lean back, straighten out, and slide forward with the aid of footrest/cushions to maintain a lengthened or linear-type body position, such as that found in the type of first-class seats which recline into an almost flat bed. Because the subject slid forward, the subject then had less support from the seat cushion under their thighs and thus needed leg and/or foot support.

Figure 16:
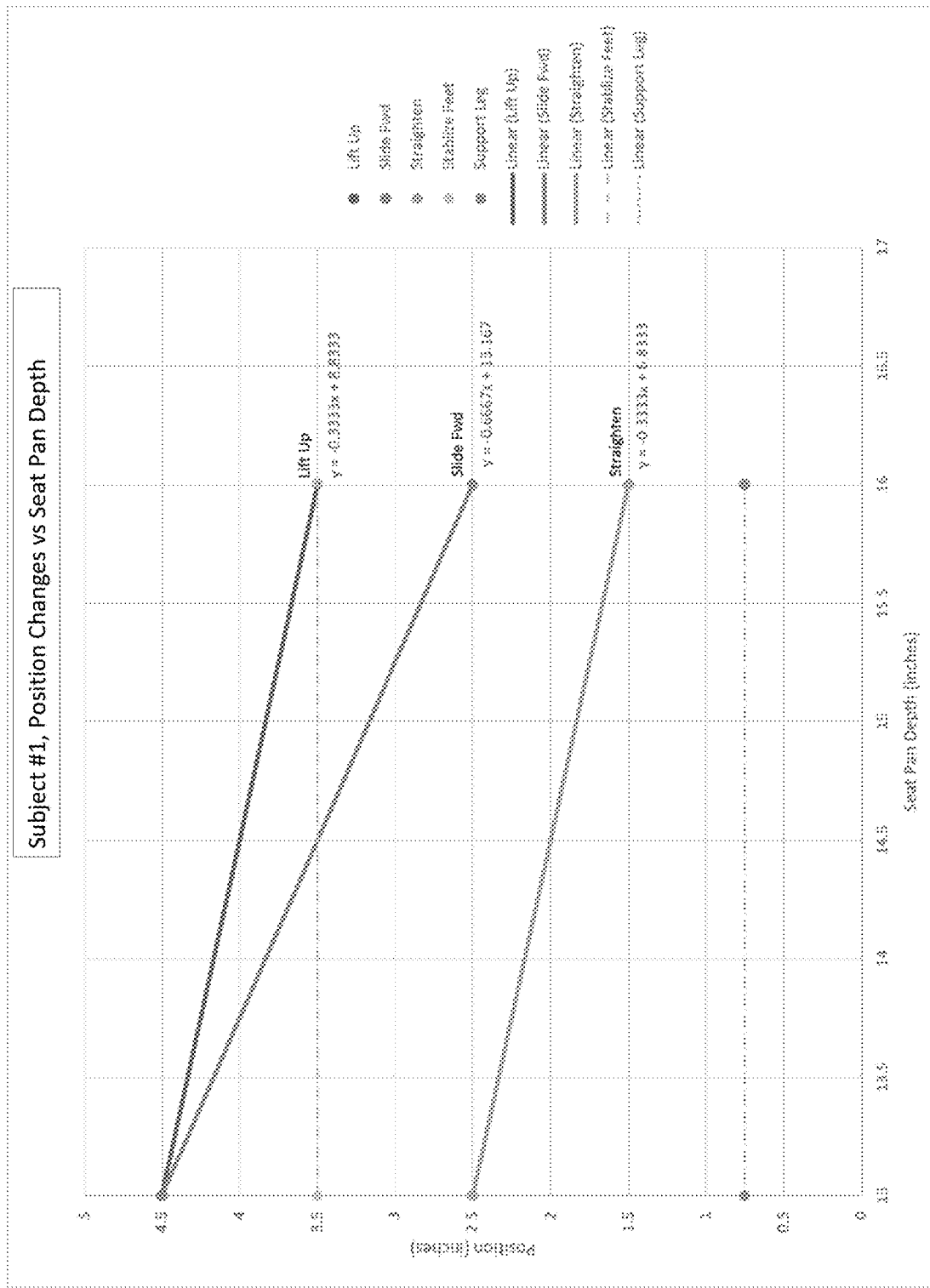
FIG. 16 is a graph of experimental data showing position changes (needed to get comfortable) versus seat pan depth.

FIG. 16 is a graph of position changes (needed to get comfortable) versus seat pan depth. FIG. 16 shows that the seat pan depth (and seat height—not shown) effects how much a subject must slide forward and straighten. The larger the seat pan depth the less the subject needs to make those adjustments. As more weight is taken off the sit bones, the less adjustment needs to be made to make the subject comfortable. With seat pan depth, more weight is transferred to more of the length of the subject's upper legs. The limited test data also seems to suggest that only simple leg and feet supports may be needed and may not need to be adjustable.

Figure 17:
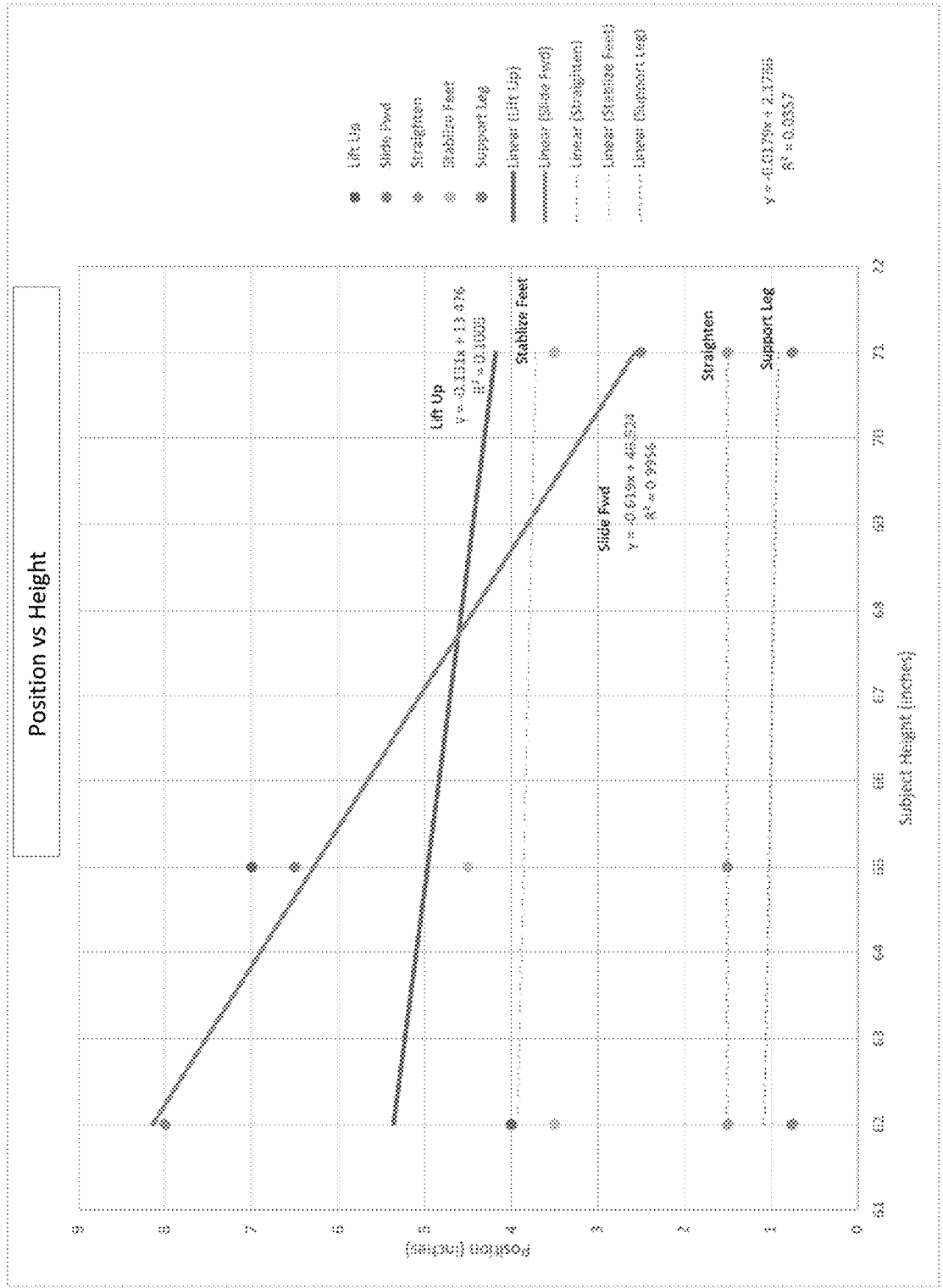
FIG. 17 is a graph of experimental data showing position changes (needed to get comfortable) versus the subject's height.

FIG. 17 is a graph of position changes (needed to get comfortable) versus the subject's height. FIG. 17 seems to suggest that the shorter the subject is, the further they can move forward, and the more comfortable they can get in the available space. The limited test data again also seems to suggest that only simple leg and feet supports may be needed and may not need to be adjustable.

Figure 18:
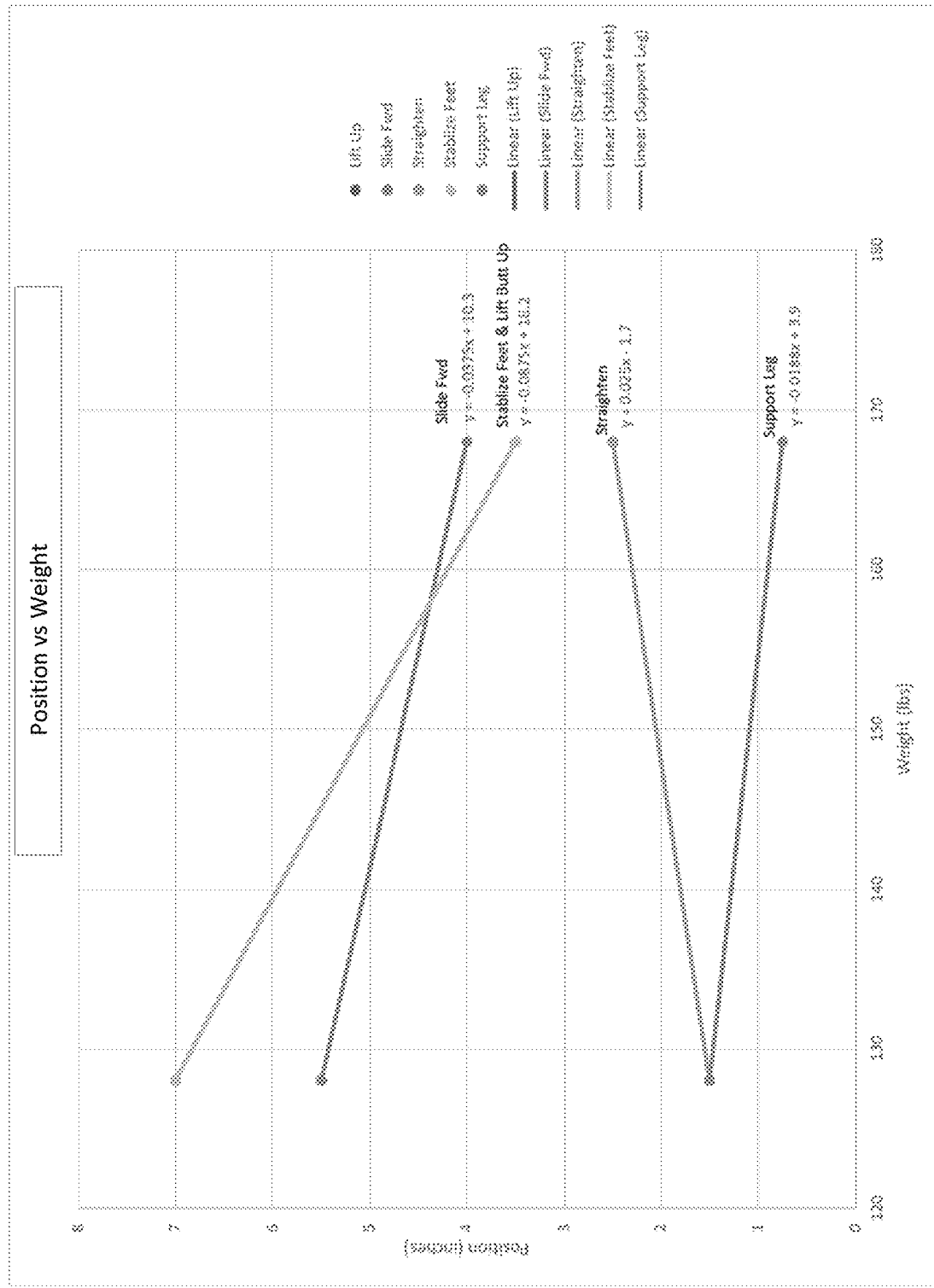
FIG. 18 is a graph of experimental data showing position changes (needed to get comfortable) versus the subject's weight.
Figure 19B:
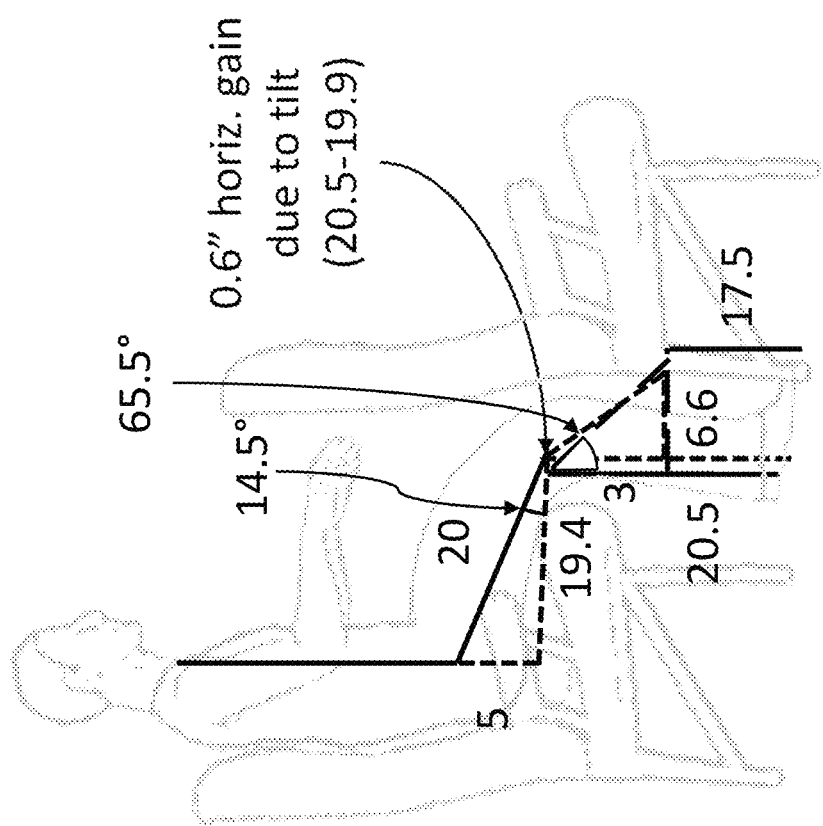
FIG. 19b shows results of example calculations for a subject in a raised sitting position.
Figure 19A:
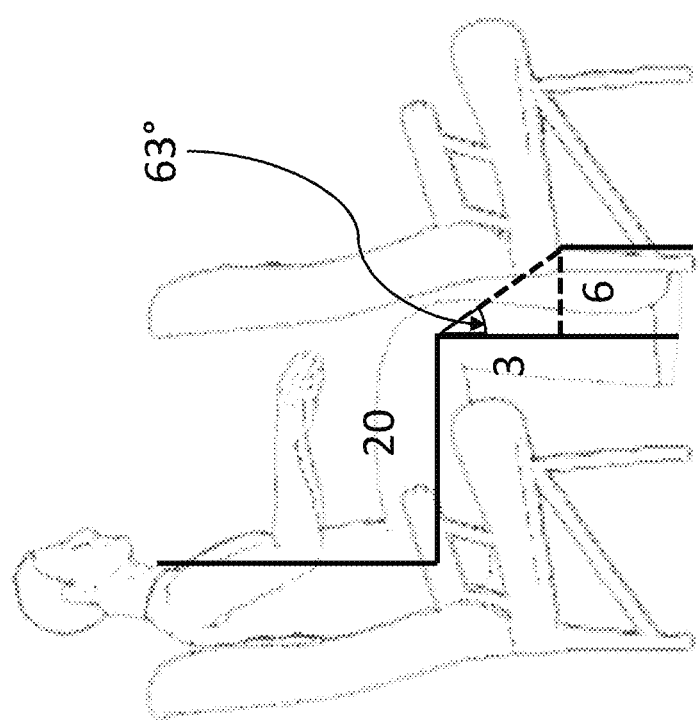
FIG. 19a shows results of example calculations for a subject in an regular sitting position.
Figure 19C:
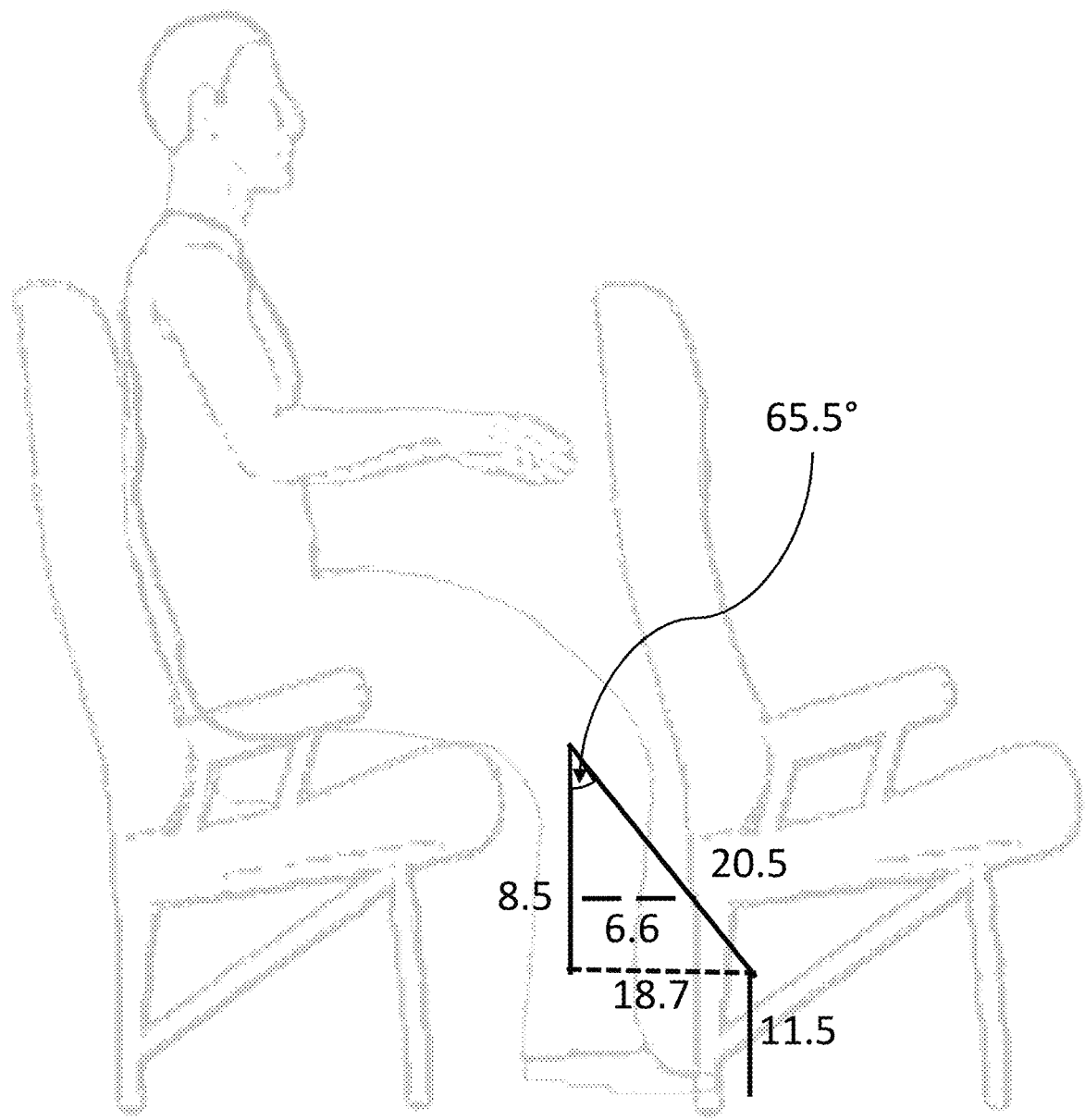
FIG. 19c shows results of example calculations for a subject in an raised sitting position with subject's feet raised by predicted calf rest air bladders.

FIG. 18 is a graph of position changes (needed to get comfortable) versus the subject's weight. FIG. 18 seems to suggest that the more a subject weighs, the more they need to distribute weight away from the sit bones and through their back by straightening into a linear-like sitting position.

Experimental data guides the algorithms used to position the user. Highly correlated trendlines (trendlines with high R-squared values) shown in FIG. 16, FIG. 17, and FIG. t a By way of example, raising Subject 1 (from Table 1 above) by 5" on a 17.5" high seat rotates the subject's 20" thighs at the hip such that the knees gain an additional 0.6" of horizontal space (rotating legs at the hip moves the knees back towards the seatback by 0.5"). This puts the subject's thighs at a 14.5° angle to the floor (or a 75° angle towards the floor). The extra 0.6" of horizontal space provided to the legs gives a 6.6" of available horizontal space 3" down from the knee/hip height—a height where, if rotated enough, the legs would hit the bottom of the seat in front of the user. This height provides the maximum rotation of the legs under the seat in front of the user. The 6.6" of available space enables the user to rotate his legs to a 65.5° angle taking up 18.7" of horizontal space from the user's standard sitting position to an extended linear sitting position (as long as there is 18.7" of available space under the chair in front of the user) and rest his legs on an 11.5" air bladder. (This does not account for foot size under the. The 65.5° angle enables the user's weight to be transferred more to the user's legs.

Measurements not taken for the test data (relating to Tables 3-4, FIG. 16, FIG. 17, and FIG. 18) that would be useful include: in a seated position, distance from the user's back to the furthest most point of the user's knee; calf thickness when lying down; shoe size; in a seated position, distance from the bottom of the thigh to top of the shoulders.

USES/OTHER USES

Airline seat manufacturing trends toward producing airline seats that are much thinner all around, thus becoming even more uncomfortable and increasing the need for passenger comfort. Airlines can also benefit from the same technology as used in the body-seat cushion as air bladders can also be built into airline seats. The technology can allow airlines to further decrease pitch between seats (as a cost-cutting measure). Further, while waiting for a flight, or via the airline website, the passenger can send measurements and/or answer questions regarding their own specific anthropometric measurements. The seat cushion algorithms can then automatically be sent to the body-seat cushion for the specifically assigned airline seat even before boarding the plane.

In addition, the airlines can have their own measurement mechanism used near the boarding gate to send data directly to a passenger's seat prior to boarding.

The seat cushion app/algorithm technology can also be used in head pillows, body pillows, neck pillows, shoes, gloves, clothing or any other product in contact with a user's body.

The body-seat cushion can also be used to adjust the user's position while lying down on top of it. The body-seat cushion can also be used in therapeutic or healthcare related settings as well, where a patient's body needs to be adjusted slightly for either comfort, physical therapy or rehabilitation strengthening.

It is anticipated that there will soon be a wide release of special virtual reality or augmented reality glasses/goggles by Oculus, Apple, Google and others. Such devices will likely allow the user to eliminate their use of traditional computer monitors by allowing the user to view the equivalent of several large virtual computer screens at once—thus making comfortable seating for a potential prolonged period of time a necessity.

These Virtual Visual Headsets (VVH) will connect to either a PC/Laptop or smart device such as a phone or tablet to increase screen size (within the goggles) as well as enhance user experience with certain software programs or games. As VVHs become more mainstream, more people are likely to spend much more time ensconced in their viewing experience in a somewhat stationary seated position, whether it be while playing a video game or doing their work with huge (virtual) screens akin to an airplane cockpit's viewing experience. This could easily lead to users wearing a VVH while sitting in a chair for 5-10 hours at a time or longer without getting up to take a break, or even moving that much in their seats.

As studies have shown, prolonged sitting can cause circulatory problems and in certain instances lead to blood clotting issues such as DVT or a PE. Thus, the concern for a comfortable chair with a seat/body cushion that would allow the user to not only be comfortable but to have features that would help prevent DVT or other circulatory problems will become a necessity. The present invention will address these needs while allowing the user to use their available seating. The present invention can also be incorporated into a sitting device designed specifically for using VVHs.

Martina Tierney, an occupational therapist and Clinical Director at Seating Matters (https://www.seatingmatters.com) provides information on the Seating Matters Online Academy on YouTube that is approved by the Royal College of Occupational Therapy. The information includes the following:

Pelvic positioning is extremely important to correct and healthy sitting. Commonly found incorrect or unhealthy sitting patterns include:
1. Sitting with a posterior pelvic tilt (sacral sitting)—sitting in a hunched over position with the lower back a few inches away from the back of a chair while the upper body leans forward creating C-shaped profile. This can create a pressure risk to the vertebra in the middle of the back and to the pelvis and lead to kyphosis—a forward rounding of the back. Sitting for a prolonged period of time in this posture can also lead to sacral, spine, and heel pressure ulcers. Causes of posterior pelvic tilt include: seat depth too long; seat to floor height too high; footplates too low; and arm rest too low.
2. Sitting with an anterior pelvic tilt—sitting with the pelvic region jutting outward like a tail. This incorrect sitting posture over time can lead to spinal muscle fatigue, potential bladder issues as pressure is constantly being exerted in this area, as well as other vertebrae compression injuries and general lower back pain and/or Lordosis. Anterior pelvic tilt is usually caused by a slope seat depth too long; seat to floor height too high; footplates too low; and arm rest too low.
3. Sitting in a pelvic obliquity position (leaning)—sitting with one side of the pelvis is higher than the other. This may be caused by or lead to scoliosis. This is often caused by or further enhanced by: a chair with no sold base of support (a saggy seat cushion); arm support is either too low or too high; or a seat that does not support femurs and feet.
4. Sitting in a pelvic rotation position—sitting with one side of the pelvis a little more forward than the other side. This usually occurs when the trunk of the body is not supported enough, the pelvis is not supported properly or the seat width is too wide.

The present invention can address each of the seat issues associated with the preceding poor seating conditions. If the seat depth too long, the body seat cushion can push the user forward—off the seat. If the seat floor is too high or the footplates are too low, the body seat cushion can elevate the foot rests. If the arm rests are too low, the body seat cushion can elevate or provide extra inflation to attached armrests. If the chair cushion is too saggy, the body seat cushions can be hyper inflated. a chair with no sold base of support (a saggy seat cushion). If the arm support too high, the body-seat cushion can raise the user up. If the seat does not provide support in the leg area, the body-seat cushion's a footrest or air bladders in the leg area can be inflated.

We hereby claim:
1. A system comprising:
   a seat cushion comprising a plurality of air bladders;
   a memory to store one or more anthropometric user measurements and one or more mechanical seat measurements of at least a first seat, wherein the one or more mechanical seat measurements of the first seat include one or more available space measurements, wherein using at least one of the one or more available space measurements enable the seat cushion to be operable on a plurality of seats;
   a processor configured to determine inflation instructions for at least one of the plurality of air bladders based on at least one of the one or more anthropometric user measurements and at least one of the one or more mechanical seat measurements of the first seat; and
   at least one valve operatively connected to at least one of the plurality of air bladders to receive air from an inflation device, the inflation device configured to inflate the at least one of the plurality of air bladders based on the inflation instructions.
2. The system of claim 1, wherein the seat cushion includes one or more of a leg area, a pelvic area, a seat back area, and a foot rest area, and wherein at least one of the plurality of air bladders associated with respective ones of these areas
   are inflatable and deflatable.

3. The system of claim 1, wherein the inflation instructions include for one or more of the plurality of air bladders at least one of:
  an air pressure;
  a volume of air; and/or
  an air bladder height.

4. The system of claim 1, further comprising of a wireless receiver configured to receive the inflation instructions; and a wireless transmitter configured to transmit apparatus data, wherein the apparatus data comprises one or more of air bladder sensor data and position data.

5. The system of claim 1 wherein the inflation instructions place the cushion in a lengthened position.

6. The system of claim 1, wherein the processor is further configured to determine one or more of vibration instructions and motion instructions.

7. The system of claim 1, wherein the inflation device is one of:
  a diaphragm pump;
  an air compressor;
  a hand pump;
  a bike pump;
  a person; and
  one or more piezoelectric fans.

8. The system of claim 1, further comprising one or more of:
  one or more heating elements and one or more cooling elements;
  one or more calf compression air bladders;
  a wireframe support system; and
  one or more telescoping rods.

9. The system of claim 1, wherein at least one of the plurality of air bladders comprises a pressure sensor.

10. The system of claim 1, further comprising one or more of:
  a pinch valve; and
  a gang valve and a plurality of stop valves.

11. The system of claim 1, wherein one or more of the anthropometric user measurements and the mechanical seat measurements of the first seat are one or more of:
  acquired from a 3D measurement application;
  manually input into a mobile application; and/or
  downloaded from an external seat measurement database.

12. The system of claim 1, wherein the inflation instructions are further based on one or more of neighbor anthropometric size data and neighbor seat position data.

13. The system of claim 1, wherein the processor is further configured to determine whether to apply the inflation instructions to the first seat based on at least one or more of the one or more mechanical seat measurements of the first seat and at least one or more mechanical seat measurements of a second seat.

14. The system of claim 1, wherein the plurality of air bladders comprises one or more seat pan air bladders and one or more neck support air bladders, and wherein the inflation instructions comprise inflating at least one of the one or more neck support air bladders when at least one of the one or more seat plan air bladders is raised above a threshold height or volume.

15. A system comprising:
  a seat cushion having a plurality of air bladders;
  a processor configured to determine inflation instructions for at least one of the plurality of air bladders based on one or more anthropometric user measurements and one or more mechanical seat measurements of a first seat, wherein the one or more mechanical seat measurements of the first seat include one or more available space measurements, wherein using at least one of the one or more available space measurements enables the seat cushion to be customized for a plurality of seats; and
  at least one valve operatively connected to at least one of the plurality of air bladders to receive air from an inflation device, the inflation device configured to inflate the at least one of the plurality of air bladders based on the inflation instructions.

16. The system of claim 15, wherein the seat cushion includes one or more of a leg area, a pelvic area, a seat back area, and a foot rest area, and wherein at least one of the plurality of air bladders
  associated with respective ones of these areas are inflatable and deflatable.

17. The system of claim 15, wherein the inflation instructions include for one or more of the plurality of air bladders at least one of:
  an air pressure;
  a volume of air; and/or
  an air bladder height.

18. The system of claim 15, further comprising of a wireless receiver configured to receive the inflation instructions; and a wireless transmitter configured to transmit apparatus data, wherein the apparatus data comprises one or more of air bladder sensor data and position data.

19. The system of claim 15, wherein the processor is further configured to determine one or more of vibration instructions and motion instructions.

20. The system of claim 15, wherein at least one of the plurality of air bladders comprises a pressure sensor.

21. The system of claim 15, wherein one or more of the anthropometric user measurements and the mechanical seat measurements of the first seat are one or more of:
  acquired from a 3D measurement application;
  manually input into a mobile application; and/or
  downloaded from an external seat measurement database.

22. The system of claim 15, wherein the plurality of air bladders comprises one or more seat pan air bladders and one or more neck support air bladders, and wherein the inflation instructions comprise inflating at least one of the one or more neck support air bladders when at least one of the one or more seat plan air bladders is raised above a threshold height or volume.

* * * * *